US011734688B2

(12) United States Patent
Scarborough et al.

(10) Patent No.: US 11,734,688 B2
(45) Date of Patent: Aug. 22, 2023

(54) SYSTEM TO DETERMINE GROUP ASSOCIATION BETWEEN USERS

(71) Applicant: AMAZON TECHNOLOGIES, INC., Seattle, WA (US)

(72) Inventors: Benjamin Charles Scarborough, Everett, WA (US); Gareth Ujvarosy, Issaquah, WA (US); Vinodh Muthiah, Seattle, WA (US); Maxwell Aaron Corman, Seattle, WA (US); Salvador Bedredin Medina Maza, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 441 days.

(21) Appl. No.: 16/023,748

(22) Filed: Jun. 29, 2018

(65) Prior Publication Data

US 2020/0005319 A1  Jan. 2, 2020

(51) Int. Cl.
*G06Q 40/06* (2012.01)
*G06Q 20/40* (2012.01)
(Continued)

(52) U.S. Cl.
CPC ....... *G06Q 20/40145* (2013.01); *G06V 20/52* (2022.01); *G06V 40/20* (2022.01); *G06V 40/28* (2022.01); *G07C 9/37* (2020.01)

(58) Field of Classification Search
CPC .... G08B 23/00; G08B 13/19643; G07C 9/15; G07C 9/10; G07C 9/29; E05F 15/79;
(Continued)

(56) References Cited

U.S. PATENT DOCUMENTS

| 5,666,157 A | * | 9/1997 | Aviv | ................ | G08B 13/19602 |
|---|---|---|---|---|---|
| | | | | | 348/150 |
| 5,875,305 A | * | 2/1999 | Winter | ............. | G08B 13/19604 |
| | | | | | 709/231 |

(Continued)

FOREIGN PATENT DOCUMENTS

| CA | 2692219 A1 * 12/2008 | ............. G06Q 10/10 |
|---|---|---|
| JP | 2007286872 A   11/2007 | |

(Continued)

OTHER PUBLICATIONS

J. Brindtha, K. R. Hithaeishini, R. Komala, G. Abirami, U. Aru; Identification and detecting of attacker in a purchase portal using honeywords, Mar. 1, 2017, IEEE, web, 389-393 (Year: 2017).*

(Continued)

*Primary Examiner* — I Jung Liu
(74) *Attorney, Agent, or Firm* — Lindauer Law, PLLC

(57) ABSTRACT

A facility may allow an authorized user to sponsor other users to enter. Actions taken by those users may be associated with the account of the authorized user. Sensor data obtained at a portal may be indicative of whether a user attempted to provide credentials to a sensor at the portal, time between entry of users, attributes about the user, and so forth. Information about when the users have exited may also be obtained. For example, if three people entered one after another and then left at the same time, they may be deemed to form a group. Based on this information, the actions taken by the users in the group may be associated with the account of the authorized user.

21 Claims, 12 Drawing Sheets

(51) Int. Cl.
*G07C 9/37* (2020.01)
*G06V 20/52* (2022.01)
*G06V 40/20* (2022.01)

(58) Field of Classification Search
CPC ............... G06Q 20/206; G06Q 20/204; G06Q 30/0635; G06Q 40/00
See application file for complete search history.

(56) References Cited

U.S. PATENT DOCUMENTS

| | | | |
|---|---|---|---|
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,189,855 | B2 | 5/2012 | Opalach et al. |
| 8,630,924 | B2 | 1/2014 | Groenevelt et al. |
| 9,235,928 | B2 | 1/2016 | Medioni et al. |
| 9,473,747 | B2 | 10/2016 | Kobres et al. |
| 10,007,892 | B1 | 6/2018 | Hahn et al. |
| 10,380,814 | B1* | 8/2019 | Mathiesen ............. G07C 9/253 |
| 2011/0011936 | A1 | 1/2011 | Morandi et al. |
| 2011/0032353 | A1* | 2/2011 | Vallone ............ G08B 13/19693 348/143 |
| 2012/0180103 | A1 | 7/2012 | Weik et al. |
| 2012/0284132 | A1 | 11/2012 | Kim et al. |
| 2013/0284806 | A1 | 10/2013 | Margalit |
| 2014/0019241 | A1* | 1/2014 | Treiser ............... G06Q 30/0609 705/14.53 |
| 2014/0159869 | A1* | 6/2014 | Zumsteg ................ G07G 1/009 340/10.1 |
| 2015/0086107 | A1 | 3/2015 | Dedeoglu et al. |
| 2016/0055692 | A1* | 2/2016 | Trani ................. G07C 9/00571 340/5.61 |
| 2016/0323274 | A1 | 11/2016 | Chandrasekaran et al. |
| 2017/0228804 | A1* | 8/2017 | Soni ................... G06Q 30/0641 |

FOREIGN PATENT DOCUMENTS

| | | |
|---|---|---|
| JP | 2008014001 A | 1/2008 |
| JP | 2008117264 A | 5/2008 |
| JP | 2014142838 A | 8/2014 |
| JP | 2015011597 A | 1/2015 |

OTHER PUBLICATIONS

Anastasov, Yuliyan, "Patent Cooperation Treaty International Search Report and Written Opinion dated Sep. 13, 2019", Patent Cooperation Treaty Application No. PCT/US2019/039492, Patent Cooperation Treaty, Sep. 13, 2019.

Asthana, et al., "An Indoor Wireless System for Personalized Shopping Assistance", CiteSeerX, In Proceedings of IEEE Workshop on Mobile Computing Systems and Applications, 1994. Retrieved from the Internet: <URL:http://citeseerx.ist.psu.edu/viewdoc/summary?doi=10.1.1.127.3033>.

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing,China, Sep. 17-21, 2011.Retrieved from the Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

Vu, et al., "Distinguishing Users with Capacitive Touch Communication", WINLAB, Rutgers University, In proceedings of: The 18th Annual International Conference on Mobile Computing and Networking ("MobiCom'12"), Aug. 22-26, 2012, Istanbul, Turkey.

Lee, Sun Hwa, "Notification of Transmittal of the International Search Report and Written Opinion dated Jan. 7, 2021", Patent Cooperation Treaty Application No. PCT/US19/39492, Patent Cooperation Treaty, Jan. 7, 2021.

Japanese Office Action dated Mar. 11, 2022, JP Patent Application No. 2020-571765, Japan Patent Office, dated Mar. 11, 2022.

* cited by examiner

SYSTEM TO DETERMINE GROUP ASSOCIATION BETWEEN USERS

BACKGROUND

Facilities such as stores, libraries, hospitals, offices, and so forth, may need the ability to identify users in the facility who are associated with one another.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
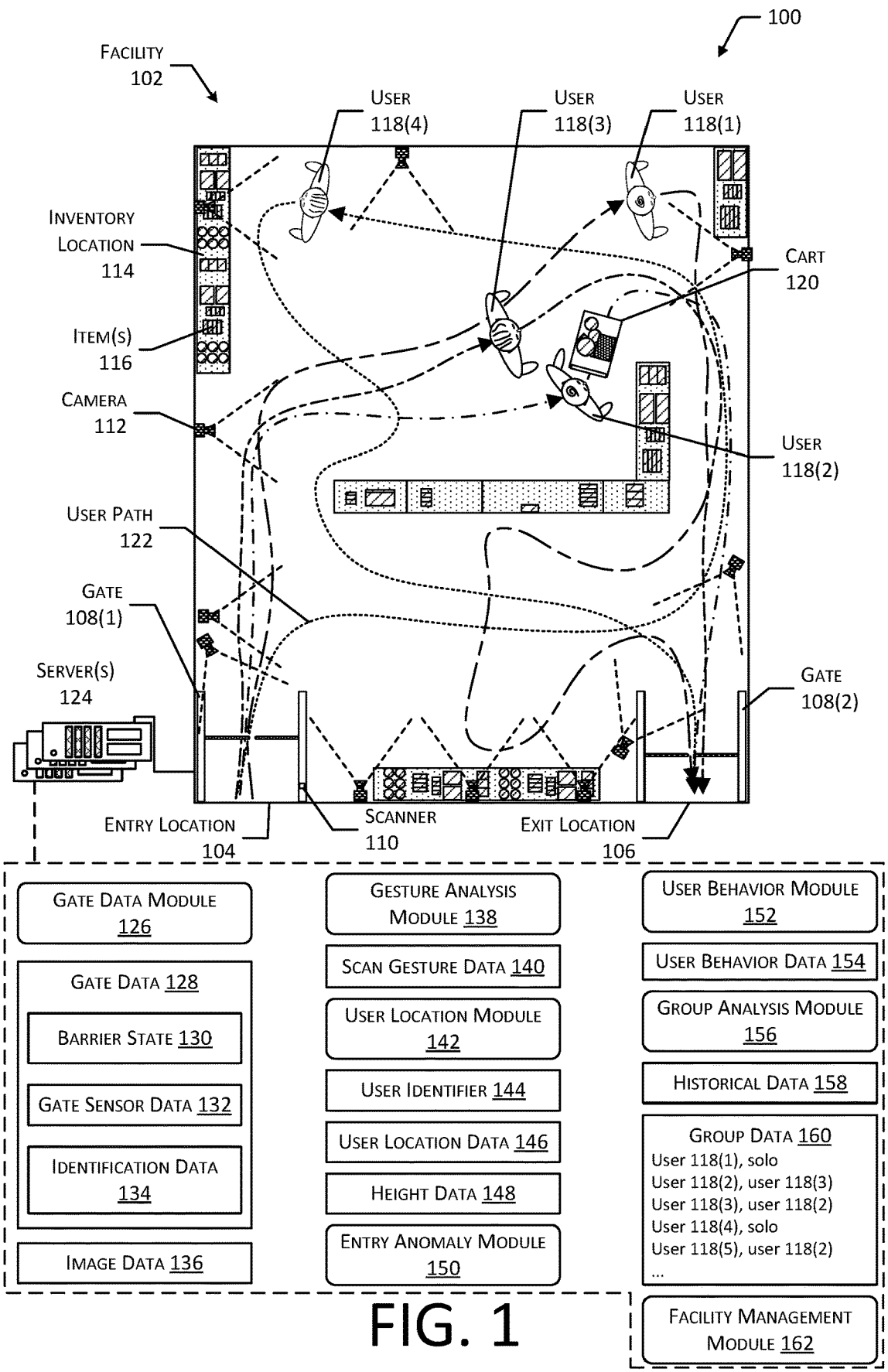
FIG. 1 illustrates a system to determine whether users at a facility are part of a group, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A facility may maintain information about users who enter the facility. This information may be used to determine if a user entering the facility is an authorized user or unauthorized user, associate interactions taken by the user with a particular account, and so forth. An authorized user may comprise a user who is has previously setup a payment account with the facility or an associated system. In comparison, an unauthorized user may comprise a user who has no valid payment account with the facility or the associated system. An authorized user may bring someone with them to the facility. For example, the authorized user may bring a friend, colleague, child, and so forth to a material handling facility. The authorized user and the guest user may be associated with one another, forming a group. The actions of group members may be attributed to or associated with the account of the authorized user. Continuing the example, the friend of the authorized user may pick an item, resulting in the account of the authorized user being billed for that item.

One technique for determining members of a group is to strictly enforce a "one scan, one user enters" procedure during entry. This technique may fail to properly determine group membership in various situations, such as when the authorized user is carrying a child, or when one user "tailgates" or "frontgates" another. Tailgating occurs when one or more additional people follow an authorized user through a gate. These tailgaters may or may not be associated with the authorized user they followed. Frontgating occurs when one or more additional people precede an authorized user through the gate. These frontgaters may or may not be associated with the authorized user they preceded.

Described in this disclosure are various techniques and systems that may be used to determine group data that is indicative of whether two or more users of a facility are associated with one another as a group. During entry, users may pass through a gate at an entry location. The gate may provide gate data indicative of when the gate was open, data indicative of a count of people determined to have passed the gate while the gate was open, identification data that was presented at the gate, and so forth. For example, the gate may include a scanner with a camera, and the identification data may comprise an image of a user's palm, an image of a smartphone presenting a machine-readable code, an image of an identification card, and so forth. The system may or may not consider whether the identification data is valid and authorized prior to entry of the user. For example, a user with expired or incorrect identification data may still be permitted to enter the facility.

Cameras at the facility may acquire image data. For example, cameras may acquire images of the entry gate. This image data may be processed to determine if the user made a scan gesture. For example, the scan gesture may comprise movement of an arm towards, over, and away from the scanner. The image data may also be used to determine other information, such as a count of users who entered through the entry gate.

During operation of the facility, those users who are attending by themselves may typically be expected to present their identification data at the gate, such that each person is associated with identification data, resulting in one scan of identification data and one entry of a person. An authorized user with guests may present their identification data once for each guest who passes through the gate, again producing one scan per person entering.

An entry anomaly may occur when the "one scan, one entry" condition is not adhered to. The entry anomaly may be detected based at least in part on the gate data, image data, and so forth. For example, the image data may indicate that one user did not perform a scan gesture. In another example, the gate data and image data may show that the authorized user and another user passed through the gate within a short threshold amount of time of one another. In another example, a count of the identification data presented at the gate may differ from a count of people detected at the gate by one or more of the gate data or the image data. In yet another example, presence of a user within the facility as determined by the image data without data indicative of their entry may be deemed an entry anomaly.

User location data indicative of a location of individual users at or near the entry location and elsewhere within the facility is determined using image data from cameras. Each user may be assigned a user identifier. The user identifiers distinguish one user in the facility at that time from another and are not necessarily indicative of a definitive unique identity. For example, the user identifiers may be serial numbers that are assigned in sequential order, regardless of the actual identity of the user they represent.

Other data about the users may be determined based on image data or data obtained from other sensors. For example, the cameras may provide depth data that may be used to determine an estimated height of the users.

When an entry anomaly is determined, an initial determination is made regarding who is present at the time and location of the entry anomaly. For example, an entry anomaly may be determined at a first entry location at a first time. The user location data may indicate that a first user and a second user are determined to be at a first entry location at the first time. The first user may be assigned a first user identifier and the second user may be assigned a second user identifier.

Group data may be generated that is indicative of whether the first user identifier is associated with the second user identifier. This determination may be based on assessing one or more conditions that are suggestive of grouping as compared to one or more of the gate data, the image data, gesture data, user location data, height data, user behavior data, historical data, and so forth. In one implementation, based on the data available, a score may be calculated for each user identifier that is indicative of whether that user is by themselves or a member of a group. For example, presentation of identification data may decrease the score while failure to present identification data may increase the score.

The group data may also be based on information about user behaviors. For example, if the first user and the second user remain close to one another while in the facility, they may comprise a group. In another example, if the first and second users exited the facility at about the same time and by the same exit location, this may be indicative of those users comprising a group.

Once group data has been determined, other interactions within the facility may be attributed to an appropriate account. For example, as the authorized user and their guest travel through the facility, when the guest picks an item and they leave the facility, the account associated with the authorized user may be billed for the item.

The techniques and systems described in this disclosure offer significant technological improvements. Compared to previous systems that required strict adherence to "one scan, one person", the systems described herein allow for an automated system to efficiently and accurately identify groups of users in a dynamically changing environment without human intervention. This significantly increases the number of users who may pass through an entry in a given amount of time, allowing either the use of fewer entry locations or allowing more users to use the facility. In addition, other systems involved in managing the facility realize significant improvements in data quality and operation by having at least one account associated with each user within the facility. Also, the techniques and systems described herein allow guests of an authorized user to enter the facility without necessarily being enrolled in the system, while still providing at least a substantial portion of the functionality normally afforded to authorized users without hindrance. For example, an authorized user may bring a guest to the facility. While at the facility, the guest may use the facility subject to the permissions afforded to the authorized user, without the need for any special steps that may slow down or otherwise impede entry. In comparison, traditional techniques may have involved the user and their guest using a special entry process, such as stopping at a security desk to receive temporary credentials, and so forth.

Illustrative System

FIG. 1 illustrates a system 100 to determine whether users at a facility are part of a group, according to some implementations. A facility 102 may include one or more portals such as one or more entry locations 104 and one or more exit locations 106. Each entry location 104 and exit location 106 may include one or more gates 108.

In some implementations, the gate 108 may include a movable barrier to control movement of users. For example, the gate 108 may include computer-controlled panels that may be closed to impede passage of the user or opened to permit passage of the user. The gate 108 may include one or more of a scanner 110 or other sensor. For example, the scanner 110 may be placed in a pedestal or console on one side of the gate 108, and comprise a camera 112 having a field of view that is directed upward.

The facility 102 may include cameras 112. Some of these cameras 112 may have their respective fields of view directed towards inventory locations 114. The inventory locations 114 may include one or more of a platform, a rack, a case, a cabinet, a bin, a floor location, or other suitable storage mechanisms for holding, supporting, or storing items 116.

During use, a user 118 may approach the gate 108 at the entry location 104 and present to the scanner 110 something that is used to provide identification data. For example, if the identification data is based on biometric information, the scanner 110 may obtain an image of the user's 118 hand or portion thereof. In another example, the identification data may be obtained from a machine-readable code that is presented on a display of a smartphone that the user 118 presents to the scanner 110. In yet another example, the identification data may be obtained from a pre-printed card that the user 118 presents to the scanner 110. In other implementations, the scanner 110 may comprise a radio-frequency identification (RFID) reader, Bluetooth transceiver, and so forth.

The users 118 may include humans, robots, or both. For example, the user 118 may go to the facility 102, bringing a robot to assist them.

The user 118 uses the entry location 104 and passes through the gate 108(1) into the facility 102. While in the facility 102, the user 118 may utilize a cart 120. The user 118 may move about the facility 102, with those movements indicated in this illustration by a user path 122. The user 118 may pick items 116 from the inventory locations 114 and place them in the cart 120, or return items 116 to the inventory locations 114. Eventually, the user 118 concludes their visit and leaves the facility 102 by passing through the gate 108(2) at the exit location 106. In some implementations, a single gate 108 may operate as both an entry location 104 and an exit location 106 at the same time. For example, users 118 may enter and exit through the same gate 108(1). In other implementations a gate 108 may operate as an entry location 104 at one time, and an exit location 106 at another time. For example, during peak hours more gates 108(1) may be designated as entry locations 104 to allow more users 118 to enter. Users 118 may enter and exit the facility 102 using the same or different gates 108. For example, as depicted here user 118(1) may enter through gate 108(1) and exit through gate 108(2).

In this illustration four users 118(1)-(4) are depicted. For the sake of illustration, and not necessarily as a limitation, user 118(1) is alone, user 118(2) is an authorized user with user 118(3) as a guest, and user 118(4) is alone. One or more servers 124 may perform the various operations described below.

A gate data module 126 may receive data associated with operation of the gate 108. The gate data module 126 produces gate data 128 that may include one or more of barrier state 130, gate sensor data 132, or identification data 134. The barrier state 130 may comprise data indicative of whether the movable barrier at the gate 108 is open or closed at particular times. The gate sensor data 132 may comprise data from sensors at the gate 108 such as proximity sensors, optical sensors, torque sensor for the moveable barrier, and so forth. For example, the gate sensor data 132 may comprise data obtained by a proximity sensor that is indicative of presence of an object at the gate 108. In another example, based on data from the torque sensor, the gate sensor data 132 may indicate that the moveable barrier encountered an obstruction while attempting to close. The gate data 128 may be indicative of when a user 118 entered the facility 102.

The scanner 110 at the gate 108, or elsewhere at the entry location 104, produces the identification data 134. For example, if the scanner 110 comprises a camera 112, the identification data 134 may comprise image data that depicts at least a portion of a hand, a display of an electronic device, a pre-printed card, and so forth. In another example, if the scanner 110 comprises a near field communication (NFC) reader, the identification data 134 may comprise information obtained from an NFC tag presented by the user 118.

Within the facility 102, one or more cameras 112 may have fields of view that include at least a portion of the entry location 104 and generate image data 136. For example, cameras 112 may be arranged to acquire images from overhead and at an oblique angle. Image data 136 may be obtained from other locations throughout the facility 102. In some implementations cameras 112 may be arranged around an exterior of the facility 102. For example, cameras 112 may be arranged to acquire image data 136 of users 118 as they approach the entry location 104, in the parking lot, and so forth. In some implementations, the image data 136 may be used to determine an entry time of the user 118 to the facility 102.

A gesture analysis module 138 accesses image data 136 to determine scan gesture data 140. For example, the image data 136 obtained from a camera 112 that is above the scanner 110 may be processed and used to determine the path of a hand of the user 118 while at the gate 108. A scan gesture may comprise presence of a hand or object at a particular time with respect to the scanner 110, one or more movements or series of movements performed by the user 118 that is indicative of the production of identification data 134 from the scanner 110, and so forth. For example, the scan gesture may comprise the presence of a user's hand over the scanner 110 at a particular time. In another example, the scan gesture may comprise the user 118 moving a smartphone along a path that passes the smartphone over the scanner 110. In yet another example, the scan gesture may comprise the user 118 moving their hand over the scanner 110. The particular motions involved in the scan gesture may be based at least in part on the type of scanner 110 that is being used. For example, if the scanner 110 is obtaining an image of at least a portion of the user's 118 hand for subsequent biometric analysis, the scan gesture may include the overall movement towards the scanner 110 with a brief pause or minimum amount of dwell time over the scanner 110 followed by movement of the hand away from the scanner 110. The gesture analysis module 138 may utilize one or more artificial neural networks, classifiers, or other techniques to determine if the image data 136 is representative of a scan gesture or not. In some implementations the scan gesture data 140 may comprise data that is indicative of whether a scan gesture was made at a particular time.

A user location module 142 may use one or more of the image data 136 or data from other sensors during operation. The user location module 142 may assign a user identifier 144 to each user 118 in the facility 102 and generate user location data 146 that is indicative of a location within the facility 102 at particular times. For example, the user location module 142 may process the image data 136 obtained by the cameras 112 at known locations and with known fields of view to determine a location of an object present in the images that is determined to be the user 118. In other implementations, other techniques may be used for determining the user location data 146.

The user location module 142 or another module may associate a user identifier 144 with each user 118. The user identifiers 144 distinguish one user 118 in the facility 102 at that time from another user 118, and are not necessarily indicative of a definitive unique identity. For example, the user identifiers 144 may be serial numbers that are assigned in sequential order, regardless of the actual identity of the user 118 they represent. In some implementations, the identification data 134 presented at the gate 108 may be used to authenticate and affirmatively identify a particular user 118. For example, if the scanner 110 acquires an image of at least a portion of the user's 118 hand to perform biometric identification, the user identifier 144 subsequently assigned to that user 118 may be associated with that particular identity.

In some implementations the user location module 142 or another module may determine height data 148 of the user 118. For example, the image data 136 may be processed to determine a height of the user 118 as they pass through the gate 108 or elsewhere within the facility 102. In some implementations the cameras 112 may include a depth channel that is able to provide information indicative of a distance between the camera 112 and an object in the camera's 112 field of view. For example, the camera 112 may comprise a range camera that includes or is associated with a structured light system, time-of-flight system, coded aperture, and so forth that is able to provide image and depth or distance information for pixels within the image. Based on this information, height data 148 of the user 118 may be obtained. In other implementations other techniques may be used. For example, the gate 108 may include a vertically arranged optical curtain, such that interruption of one or more beams of the curtain provide information as to a maximum height of an object passing through the gate 108. The height data 148 may be associated with a particular user identifier 144.

An entry anomaly module 150 determines when the data associated with the entry location 104 is inconsistent or outside of a predetermined set of one or more conditions. In one implementation, an entry anomaly may be determined to occur when a "one scan, one entry of one person" condition is not adhered to. The entry anomalies may be determined based on one or more of gate data 128 or data based on image data 136 or other sensor data. Entry anomalies may include one or more of the following: The scan gesture data 140 may indicate that a user 118 at the gate 108 did not perform a scan gesture. A user 118 passed through the gate 108 but no usable identification data 134 was produced. Two users 118 passed through the same gate 108 within a threshold time of one another, with that threshold time being considered too short for typical passage of separate users. A user 118 entered the facility 102 while the barrier state 130 indicates the gate 108 was closed. Gate sensor data 132 is indicative of possible occurrence of tailgating. The barrier state 130 indicates the gate 108 was open for longer than a threshold amount of time. A count of identification data 134 presented at the gate 108 at a particular time differs from a count of a number of users 118 detected at the gate 108. A user 118 is found to be present inside the facility 102 without data indicative of their passage through a gate 108. A user 118 below a minimum threshold height may pass through the gate 108. Other entry anomalies may also be determined.

A user behavior module 152 generates user behavior data 154 that is indicative of interactions between two or more users 118 within the facility 102. The user behavior module 152 may use data such as the image data 136, the user location data 146, and so forth during operation. For example, the user behavior module 152 may receive data from another module that processes image data 136 and generates information indicative of whether users 118 are picking or placing items 116 at inventory locations 114, placing or retrieving items 116 from a single cart 120, passing objects between one another, and so forth. Continuing the example, the user behavior data 154 may be indicative of the user 118(1) handing an object, such as an item 116, to the user 118(2). In another example, the user behavior data 154 may indicate that two users 118 are within a threshold distance of one another and the duration of that proximity. In yet another example, the user behavior data 154 may indicate a count of a number of times that one user 118(1) is within a threshold distance and is facing another user 118(2).

The exit location 106 may include one or more of gates 108, cameras 112, and so forth. As a user 118 leaves the facility 102, additional gate data 128, image data 136, or other sensor data may be obtained. This data may be used to determine an exit time of the user 118, that is indicative of when the user 118 is deemed to have left the facility 102. For example, the gate data 128 may indicate a time at which the gate 108 was opened to allow a user 118 to pass, and a gate identifier indicative of that particular gate 108.

A group analysis module 156 may use the data from one or more of the above modules, and in some implementations historical data 158, to determine group data 160. The group data 160 comprises information that may indicate whether one user identifier 144 is associated with another user identifier 144, designate an account associated with a user 118, and so forth. For example, the group analysis module 156 may determine group data 160 that indicates user 118(3) is associated with the account of user 118(2). In another example, the group analysis module 156 may determine group data 160 indicating that users 118(2) and 118(3) are associated with one another. In some implementations the group analysis module 156 may determine group data 160 on an ongoing basis. In other implementations, the group analysis module 156 may generate group data 160 responsive to the entry anomaly module 150 determining occurrence of an entry anomaly.

The group analysis module 156 may receive data indicative of an entry anomaly at a first gate 108 at a first time. A determination may be made that user 118(2) and user 118(3) are present at the first gate 108 within a threshold time of the first time. For example, based on one or more of gate data 128 or user location data 146, the group analysis module 156 may determine that the first user 118(2) and the second user 118(3) are at the gate 108(1) within the same 2- second interval. Continuing the example, the data indicates that users 118(1), 118(2), 118(3), and 118(4) were not present at the gate 108 within the same 2-second interval.

The gate data 128 may indicate that users 118(1), 118(2), and 118(4) presented identification data 134(2) at the gate 108(1). As described above, the user location module 142 may assign user identifiers 144(1)-(4), respectively, to the users 118(1)-(4). In this example, no identification data 134 was provided by the user 118(3). Entry times are also determined associated with each of the users 118. For example, the entry times may be based on gate sensor data 132, image data 136, and so forth.

The group analysis module 156 attempts to determine whether a user 118 associated with an entry anomaly is entering the facility 102 as part of a group or is by themselves. This determination may involve partitioning those users 118 entering the facility 102 into groups. For example, a user 118 who presents identification data 134 and is separated by more than the threshold time from the preceding user 118 and following user 118, may be deemed to be entering the facility 102 by themselves, or "solo". However, a user 118 who enters without associated identification data 134 may be at least tentatively designated as belonging to a group.

An initial partitioning may be based at least in part on the sequential or subsequent presentation of identification data 134 that differs. For example, users 118(1) and 118(2) provide different identification data 134, which may be deemed to partition the two and not being members of the same group. In another example, if each of users 118(10)-118(30) present identification data 134 that is different from the user 118 immediately in front or behind, the group analysis module 156 may determine these as being solo users 118, and not member of group.

The initial partitioning may be based at least in part on a different in entry times exceeding a threshold value. For example, users 118 who enter more than 10 minutes apart may be deemed to be solo unless explicitly associated. Such an explicit association may be that the later user 118 presents identification data 134 that is associated with an earlier user 118 who is still within the facility 102.

The initial partitioning may be used by the group analysis module 156 to reduce the amount of data being processed to determine the group data 160. For example, the initial partitioning may be used to determine a possible or candidate group comprising those users 118 within an initial partition. For example, the users 118(2), 118(3), and 118(4) may be part of a candidate group. The group analysis module 156 may use additional data as described herein to further determine the group data 160 that is indicative of user 118(3) being associated with user 118(2), while user 118(4) is actually using the facility 102 solo.

A session comprises the time that a user 118 is at the facility 102. For example, the session may extend from the entry time until the exit time of that user's 118 visit to the facility 102. During a visit, the group analysis module 156 may generate a session score that is indicative of whether the user 118 is likely to be by themselves or part of a group. If the score is indicative of possibly being a member of a group, the group analysis module 156 may proceed to determine which user identifiers 144 are associated, or which account a particular user 118 is associated with. For example, if the user 118(3) enters without identification data 134, the scan gesture data 140 indicates no scan gesture is made, and the user 118(3) entered within the threshold time of another user 118, the session score may be high, indicating possible group membership. Further information, such as the user behavior data 154 may increase or decrease the score. The session score is discussed in more detail below with regard to FIG. 6.

The group analysis module 156 may use other information, such as the gate data 128 obtained at exit of the users 118, user behavior data 154, and so forth to determine the group data 160. For example, if the gate data 128 indicates an entry anomaly for users 118(2) and 118(3) who entered within the threshold time of one another and then these users left the facility 102 within the threshold time of one another, the group analysis module 156 may determine group data 160 indicating that user 118(3) is associated with user 118(2). In another example, the user behavior data 154 indicating that the two users 118(2) and 118(3) remained near one another while in the facility 102, placed items 116 into a single cart 120, and so forth may also be used to determine the group data 160.

In some implementations, historical data 158 may be used by the group analysis module 156. For example, if a user 118 is affirmatively identified, their previous usage may be accessed and used to determine if this is an expected behavior. Continuing the example, the user 118(2) provides identification data 134 that affirmatively identifies user 118(2) as "Alice Nelson". The user 118(3) who entered immediately after Alice did not make a scan gesture, and no identification data 134 was obtained with the passage of user 118(3). This entry anomaly may result in user 118(3) being assessed as a being a member of a group, but a determination needs to be made as to whether the user 118(3) is associated with user 118(2) (Alice) or user 118(4). The historical data 158 indicates that user 118(2) "Alice" has a probability of 0.7 of bringing a guest to the facility 102 during this time of day and day of the week, while user 118(4) has a probability of 0.1 of bringing a guest. In some implementations the historical data 158 may indicate that a particular account is associated with having guests in the facility. For example, the historical data 158 may indicate that the account associated with user 118(2) has a probability of 0.7 of bringing a guest to the facility 102. Based at least in part on this information, the group analysis module 156 may determine that user 118(3) is associated with user 118(2), and not user 118(4).

The group analysis module 156 is not limited to determining the group data 160 at the time of entry. The group analysis module 156 may assess data for the entire session of those users 118 who have an entry anomaly or otherwise are unassociated with a valid user account. As a result, the group data 160 may be determined after exit of one or more users 118 from the facility 102. This late time binding allows for subsequent processes such as a billing module to more accurately associate the charges for interactions with items 116 to a particular user account. The group data 160 may include data indicative of a confidence value. For example, a high confidence value may indicate a strong likelihood that two or more users 118 are associated with one another. Continuing the example, if the group data 160 based on the data obtained during the sessions of users 118(2) and 118(3) indicates that they are associated with one another with a confidence value that is greater than a threshold value, the two users 118 may be associated as members of a single group. As a result, if Alice's guest, user 118(2) picks an item 116 from the inventory location 114 and removes it from the facility 102, Alice's account will be billed for the cost of the item 116.

In some implementations, determination of an entry anomaly may invoke other actions. For example, some entry anomalies may result in directing a human operator to assist the users 118 and determine their status to use the facility 102, group membership, and so forth. In another example, a user 118 associated with an entry anomaly and unassociated with a valid user account for billing purposes may pick an item 116 that is above a threshold value. As a result, as that user 118 moves to leave the facility 102 through the exit location 106, a human associate may be dispatched to the exit gate 108(2) to resolve the matter. In another implementation the user 118 may be asked to present identification data 134 or some means of payment prior to exit.

In some implementations, the group data 160 may be subject to confirmation by a human or other system. For example, based on the group data 160 exceeding a threshold confidence level, a message may be sent to the user 118(2) confirming whether they brought a guest to the facility 102 at a particular day and time. Once confirmed, the group data 160 associated with the users 118(2) and 118(3) may be affirmed and subsequently used for billing or other purposes.

Information obtained from one or more users 118 may also be used to generate the group data 160. For example, the user 118 may use an application on their smartphone to input the number of guests they will be bringing to the facility 102, or that they have brought to the facility 102. Based at least in part on this information, the group analysis module 156 may generate the group data 160.

A facility management module 162 may provide various functions associated with operation of the facility 102. The facility management module 162 may maintain information about inventory levels of items 116, determine when to restock items 116, direct robots to restock, bill user accounts for interactions by users 118 such as picks or places of items 116, and so forth. For example, the facility management module 162 may use sensor data such as the image data 136 to determine that the user 118(3) has picked item 116(1) from inventory location 114(7). Based on the group data 160, the facility management module 162 may bill the account of the user 118(2) for the item 116(1) picked by the user 118(3).

Figure 2:
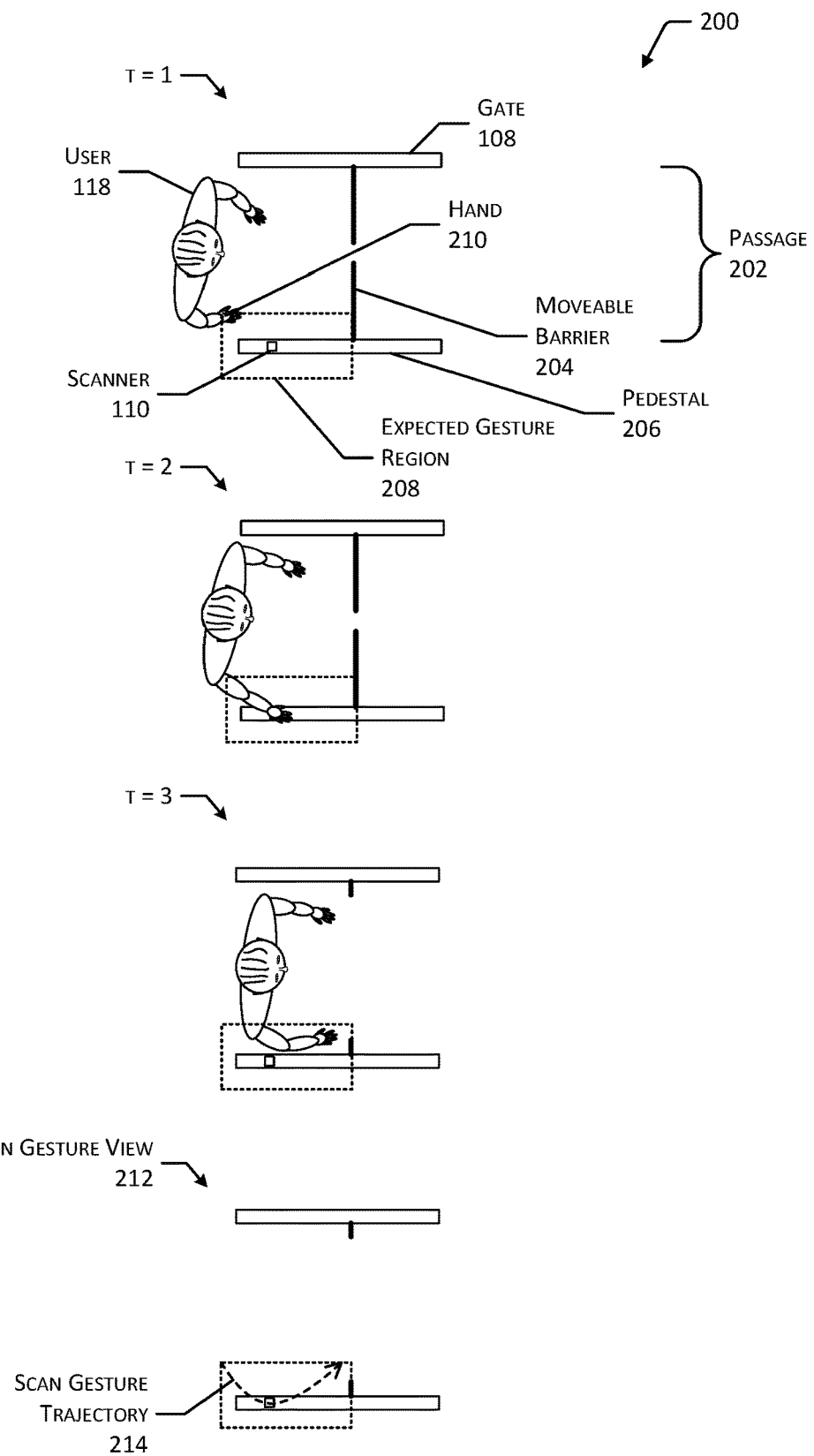
FIG. 2 illustrates a scan gesture provided at a gate, according to some implementations.

FIG. 2 illustrates a scenario 200 in which the user 118 makes a scan gesture at a gate 108, according to some implementations. As described above, the gate 108 may provide a passage 202 with one or more moveable barriers 204. By opening the one or more moveable barriers 204 the gate 108 may allow the user 118 to proceed through the passage 202. By closing the one or more moveable barriers 204, the gate 108 may prevent the user 118 from proceeding through the passage 202.

The one or more moveable barriers 204 may be supported by one or more pedestals 206. For example, a left pedestal 206 forms a left edge of the passage 202 while a right pedestal 206 forms a right edge of the passage 202. The gate 108 may include one or more scanners 110. In this illustration, a scanner 110 is located in a right pedestal 206. An expected gesture region 208 is designated. The expected gesture region 208 specifies a region that is proximate to the scanner 110. The expected gesture region 208 may comprise an area within an image or a volume within three-dimensional space within which a scan gesture is expected to be made. For example, the expected gesture region 208 depicted comprises a rectangular area that includes the scanner 110 and a portion of the right pedestal 206 before the moveable barrier 204.

The gesture analysis module 138 may use data from one or more sensors to determine if a hand 210 of the user 118 is making a scan gesture. The sensors may include one or more cameras 112 mounted overhead, a camera 112 or other sensor in the scanner 110, and so forth. For example, a plurality of images may be obtained using the one or more cameras 112. These images may be processed to determine the presence of a hand 210, and a motion of the hand as depicted in the images.

In the scenario depicted here, the user 118 approaches the gate 108 at t=1 and begins moving their right hand 210, entering a first end of the expected gesture region 208 as they prepare to pass their hand 210 over the scanner 110. At time t=2 the right hand 210 is over the scanner 110 while at time t=3 the hand 210 proceeds to exit a second end of the expected gesture region 208.

A scan gesture view 212 depicts a scan gesture trajectory 214 that is indicative of the movement of the hand 210 of the user 118 within the expected gesture region 208. The scan gesture trajectory 214 may be processed using one or more techniques to determine scan gesture data 140 that is indicative of whether a scan is deemed to have taken place. In one implementation any motion within the expected gesture region 208 may be deemed to be a scan gesture. In another implementation, the image data 136 of the expected gesture region 208 may be processed to determine the location of the user's hand 210 at successive times, which may be processed by a neural network to determine if the scan gesture trajectory 214 as observed is likely to be a scan gesture.

As described above, the entry anomaly module 150 may determine occurrence of an entry anomaly based at least in part on the scan gesture data 140. For example, if identification data 134 is received by the scanner 110 at a first time, but the scan gesture data 140 does not indicate a scan at that time, the entry anomaly module 150 may determine that an entry anomaly has occurred.

Figure 3:
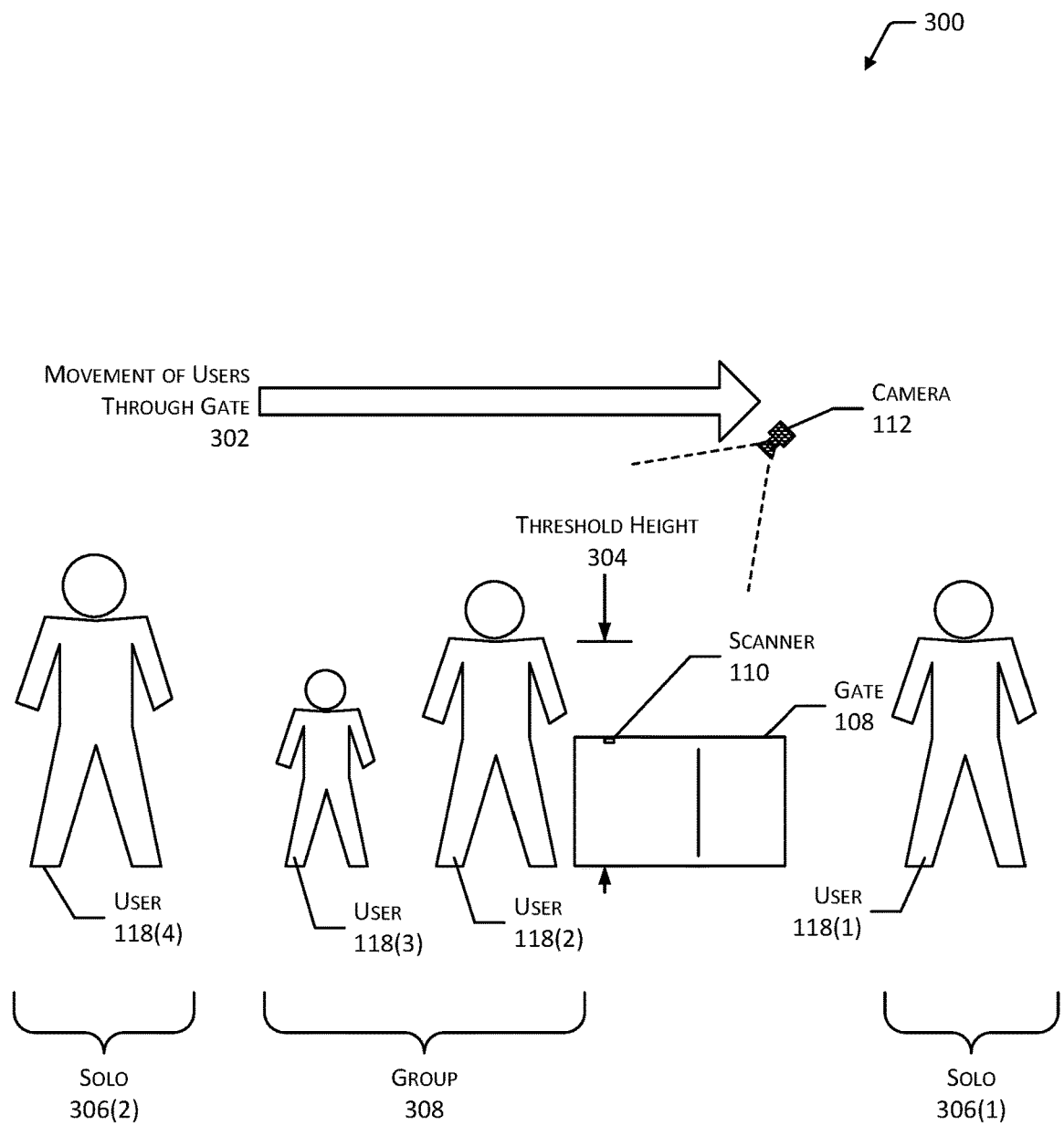
FIG. 3 illustrates users passing through a gate and their respective group associations, according to some implementations.

FIG. 3 illustrates a scenario 300 in which users 118 are passing through a gate 108 and their respective group associations, according to some implementations. Group affiliation is indicated here for illustrative purposes. As described above, in some situations the group data 160 may be not determined until after one or more users 118 exit the facility 102.

In this illustration movement of the users through the gate 302 is depicted as left to right. The users 118 are queued up to pass through the gate 108. A threshold height 304 is designated. As descried above, sensors such as one or more cameras 112 may determine height data 148 of the users 118. If the height data 148 is indicative of a user 118 having a height that is below the threshold height 304, this may be a factor that is used to determine group membership as described below.

User 118(1) has passed through the gate 108 and is designated as a solo 306(1) user. Users 118(2) and 118(3) are a group 308. User 118(4) is a solo 306(2) user. Users 118(1), 118(2), and 118(4) are taller than the threshold height 304. The height of user 118(3) is below the threshold height 304.

Figure 4:
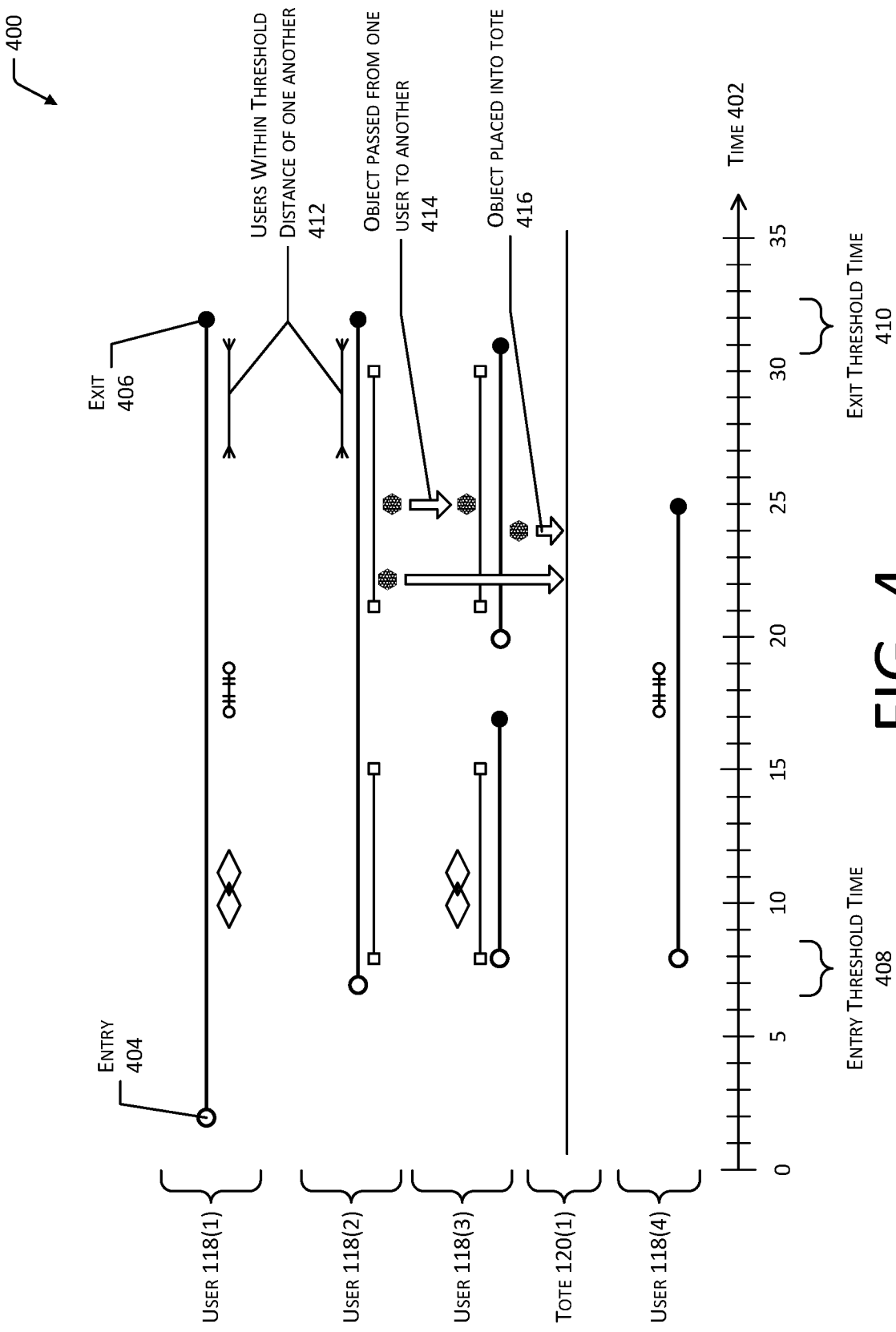
FIG. 4 is a graph illustrating entry and exit of users and some behaviors such as being near one another and passing an object from one user to another, according to some implementations.

FIG. 4 is a graph 400 illustrating entry and exit of users 118 and some behaviors such as being near one another and passing an object from one user to another, according to some implementations. In this graph, time 402 is indicated along a horizontal axis, increasing left to right. Information associated with users 118(1)-(4) is depicted respectively at different positions along a vertical axis.

Entry 404 and exit 406 of each user 118 is shown. As depicted here, the user 118(1) enters at t=2 and exits at t=32. The user 118(2) enters at t=7 and exits at t=32. The user 118(3) enters at t=8, exits at t=17, re-enters at t=20 and exits at t=31. The user 118(4) enters at t=8 and exits at t=25. An entry threshold time 408 is depicted. For example, the entry threshold time 408 shown here is equal to two units of time. An exit threshold time 410 of two units of time is also shown. The group analysis module 156 may determine whether two or more entries 404 occurred during the entry threshold time 408. If two entries 404 occur within the entry threshold time 408, the users 118 associated with those entries 404 may be possible group members. The group analysis module 156 may determine whether two or more exits 406 occurred during the exit threshold time 410. If two exits 406 occur within the exit threshold time 410, the users 118 associated with those exits 406 may be possible group members.

As described above, the user behavior module 152 may determine user behavior data 154. In this illustration users 118 within a threshold distance of one another 412 are shown using additional matching indicia. For example, users 118(1) and 118(3) are within the threshold distance of one another from t=9 to t=12. User 118(1) is within the threshold distance to user 118(4) from t=17 to t=19. Users 118(2) and 118(3) are within the threshold distance from t=8 to t=15 and t=21 to t=30.

The user behavior module 152 may determine behaviors such as an object being passed from one user 118 to another user 118. For example, as shown here at 414 the user 118(2) passes an object to the user 118(3) at t=25. In one implementation, the image data 136 may be processed to make this determination. The object may comprise an item 116, or it may comprise some other object, such as a purse, toy, hat, and so forth that the user 118 brought into the facility 102 or otherwise acquired. Shown at 416 is the user 118(2) placing an object into the tote 120(1) at t=22 and the user 118(3) placing an object into the same tote 120(1) at t=25. The object may comprise an item 116, or a personal possession of the users 118.

The group analysis module 156 may use the user behavior data 154 and other information such as gate data 128 to determine whether two or more users 118 are members of a common group 308. For example, if the time that two users 118 are within a threshold distance of one another 412 exceeds a threshold value, the likelihood that they are associated in a common group 308 may be increased. Likewise, if a user 118 passes an object to another user 118, this may be indicative of an increased likelihood that the users 118 are associated. By assessing these behaviors, the group analysis module 156 may generate group data 160 that indicates two or more users 118 are associated with one another.

Figure 5:
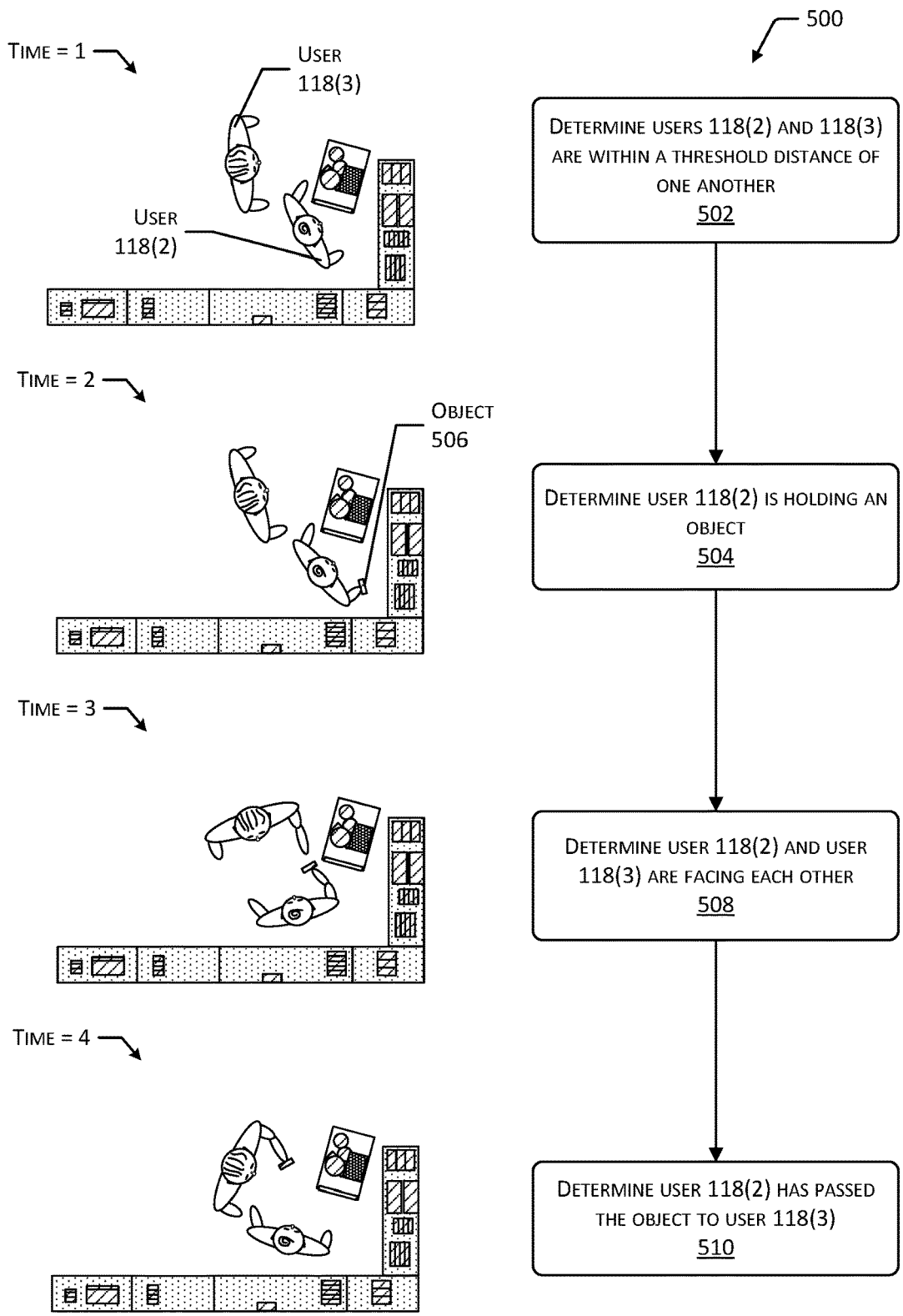
FIG. 5 illustrates a scenario of user behaviors that may be indicative of grouping, according to some implementations.

FIG. 5 illustrates a scenario 500 of user behaviors that may be indicative of grouping, according to some implementations. The behaviors may be determined at least in part by the user behavior module 152 and may be indicated in the user behavior data 154.

At 502 a determination is made that the users 118(2) and 118(3) are within a threshold distance of one another 412. For example, the user behavior module 152 may use the user location data 146 provided by the user location module 142 to determine that the locations of the users 118 are within the threshold distance of one another 412.

At 504 the user 118(2) is determined to be holding an object 506. For example, the user 118(2) may have picked an item 116 from the nearby inventory location 114.

At 508 the user 118(2) and the user 118(3) are determined to be facing each other within a threshold angle. For example, the overall orientation of the heads of the users 118 may be towards one another. In some implementations, the determination as to whether one user 118 is facing another may be based at least in part on position of one or more of their shoulders, feet, hands, and so forth.

At 510 the user 118(2) is determined to have passed the object 506 to the user 118(3). For example, the user 118(3) may now be holding the item 116 that was originally picked by the user 118(2).

Figure 6:
FIG. 6 illustrates a table of various grouping conditions and values that may be used to determine a total session score for a session that is indicative of whether a user is a member of a group, according to some implementations.

FIG. 6 illustrates a table 600 of various grouping conditions and values that may be used to determine a total session score for a session that is indicative of whether a user 118 is a member of a group 308, according to some implementations. While a table is illustrated, in other implementations the conditions and resulting values may be represented at least in part using executable code, script, or other data structures to store information. In one implementation, the group analysis module 156 may generate the total session score.

As described above, a session comprises the time that a user 118 is at the facility 102. For example, the session may extend from the entry time until the exit time of that user's 118 visit to the facility 102. Depicted are grouping conditions 602 that may be used by the group analysis module 156 to determine if a user 118 may be associated with another user 118. Each condition may be associated with a particular value 604, such as per occurrence. A count of occurrence 606 of the grouping conditions 602 during a session may be maintained. In other implementations other metrics may be used, such as total duration. A session score 608 may be determined for the grouping condition 602 as a product of the value 604 and the count of occurrences 606. The session scores 608 may be summed to produce a total session score 610.

In this illustration, the greater the total session score 610, the greater the likelihood that the user 118 is associated with another user 118. Likewise, the lower the total session score 610, the lower the likelihood that the user 118 is part of a group 308. In this illustration, the scores associated with user 118(3) are shown. For example, the user 118(3) did not make a scan gesture, no identification data 134 is associated with this user 118(3), the user 118(3) is below the threshold height 304, a total of 7 objects 506 were passed between the user 118(3) and another user. Continuing the example, the user 118(3) entered within the entry threshold time 408 of another user 118(2) and exited within the exit threshold time 410 of the other user 118(2). As a result, the total session score 610 in this illustration is 320. A total session score 610 that exceeds a threshold value of 70 may be deemed a member of a group 308, while a score less than the threshold value may indicate a solo 306 user.

The set of grouping conditions 602 shown are provided by way of illustration, and not necessarily as a limitation. It is understood that additional grouping conditions 602 may be used, or that a subset of grouping conditions 602 may be used to determine likelihood that a user 118 is a member of a group 308. In some implementations, operation of the entry anomaly module 150 and the determination of an entry anomaly may be omitted. For example, the grouping conditions 602 may be used to determine total session scores 610 for the users 118. Based on a comparison of the total session score 610 to one or more thresholds, the group analysis module 156 may generate the group data 160.

In another implementation, a subset of the grouping conditions 602 may be used to determine an entry score. For example, those grouping conditions 602 that are associated with activity at the entry location 104 may be used to generate an entry score. For example, the grouping conditions 602 associated with the entry location 104 may include the person being present at the gate 108 at a first entry time, whether the moveable barrier 204 was open at the first entry time, whether a scan gesture was made, whether identification data 134 was obtained, and so forth. If the entry score exceeds a threshold value, the system may continue to assess the user 118 to determine if they are a member of a group 308, and if so, who they are associated with.

As described above, the determination of whom the user 118 is associated with may be based on one or more of a correspondence of data with other users 118, user behavior data 154, historical data 158, and so forth. For example, grouping may be determined based on entry 404 and exit 406 times that occur within entry threshold times 408 and exit threshold times 410, respectively. However, additional information may be used to disambiguate between potential group membership. As described above, the user behavior data 154 such as passing objects 506 or using a common cart 120 may be strong indicators of two or more users 118 being associated.

Figure 7:
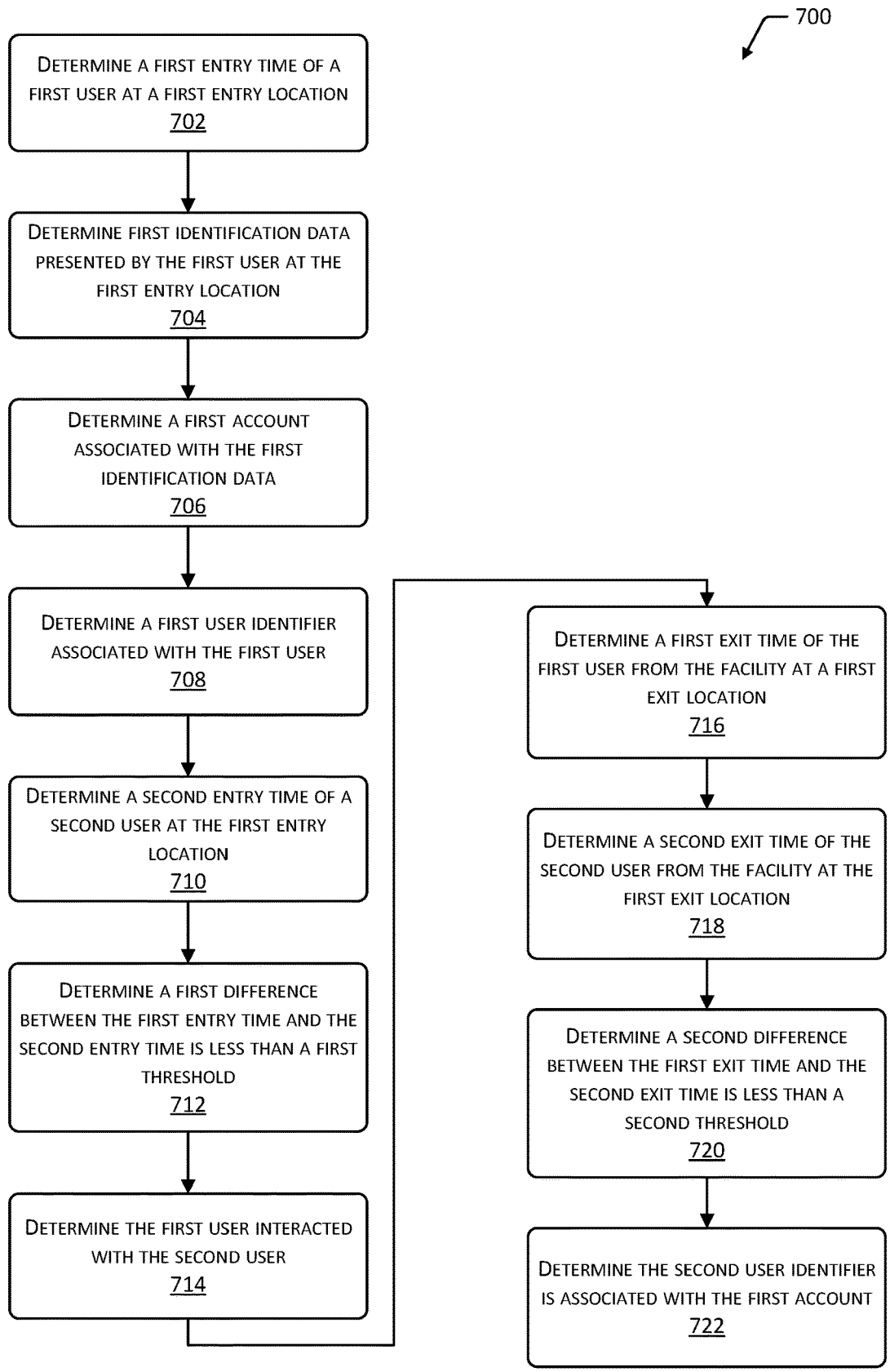
FIG. 7 illustrates a flow diagram of a process to determine a first user is associated with a second user, according to some implementations.

FIG. 7 illustrates a flow diagram 700 of a process to determine a first user is associated with a second user, according to some implementations. The process may be implemented at least in part by the system 100 described herein.

At 702 a first entry time of a first user 118 is determined at a first entry location 104. For example, the first user 118 may be present at a first gate 108 at the first entry location 104. The first entry time may be determined based on one or more of the gate data 128, image data 136, and so forth. For example, the first entry time may be the time when the user 118 passed a particular threshold, such as the moveable barriers 204.

At 704, first identification data 134 presented by the first user 118 at the first entry location 104 may be determined. For example, the scanner 110 may comprise a first camera 112 that generates image data 136. The image data 136 may include images of the identification data 134 presented by the user 118 at the first gate 108. Continuing the example, the identification data 134 may comprise image data 136 that depicts at least a portion of a hand 210, of a display of an electronic device, a pre-printed card, and so forth. In another example, if the scanner 110 comprises a near field communication (NFC) reader, the identification data 134 may comprise information obtained from an NFC tag presented by the first user 118.

At 706 a first account associated with the first identification data 134 is determined. For example, the first identification data 134 may be used to determine an affirmative identity of the first user 118, such as associated with a particular name or account number.

At 708, a first user identifier 144 is determined for the first user 118. For example, the first user identifier 144 may be assigned by the user location module 142. In some implementations the first user identifier 144 may be associated with the first account determined using the first identification data 134.

At 710 a second entry time of a second user 118 to the facility 102 is determined at the first entry location 104. The second entry time may be determined based on one or more of the gate data 128, image data 136, and so forth. For example, the second entry time may be the time when the user 118 passed the threshold of the moveable barriers 204 at the gate 108. It may also be determined that the second user 118 did not present identification data 134. For example, no identification data 134 may be received at the first gate 108 at the second time of entry.

At 712 a first difference between the first entry time and the second entry time is determined to be less than a first threshold. For example, the first user 118 and the second user 118 have entered within the entry threshold time 408.

At 714 a determination is made that the first user 118 and the second user 118 have interacted with one another. For example, the user behavior data 154 may indicate that an object 506 was passed from the first user 118 to the second user 118, or the users were within a threshold distance of one another 412 for at least a first duration.

At 716 a first exit time of the first user 118 from the facility 102 is determined at a first exit location 106.

At 718 a second exit time of the second user 118 from the facility 102 is determined at the first exit location 106. For example, the exit times may be based on image data 136 obtained by one or more cameras 112 with fields of view of the exit location 106, or by other sensors such as sensors in the gate 108(2) at the exit location 106. In some implementations, one or more gates 108 may operate as entry locations 104 and exit locations 106 either at the same time, or at different times. A user 118 may enter at one gate 108(1) operating as an entry location 104 and exit via another gate 108(2) operating as an exit location 106.

At 720 a second difference between the first exit time and the second exit time is determined to be less than a second threshold. For example, the first user 118 and the second user 118 may have exited the facility 102 within the exit threshold time 410.

At 722 the second user 118 is determined to be associated with the first account. For example, the user identifier 144 of the second user 118 may be associated with the first account that is associated with the first user 118. For example, the group data 160 may be indicative of the association between the first user and the second user, the second user and the first account, and so forth.

While the techniques above are described with regard to two users 118, it is understood that the techniques may be extended to groups of any number of users. For example, first, second, and third users 118 may be in a group 308.

Figure 8:
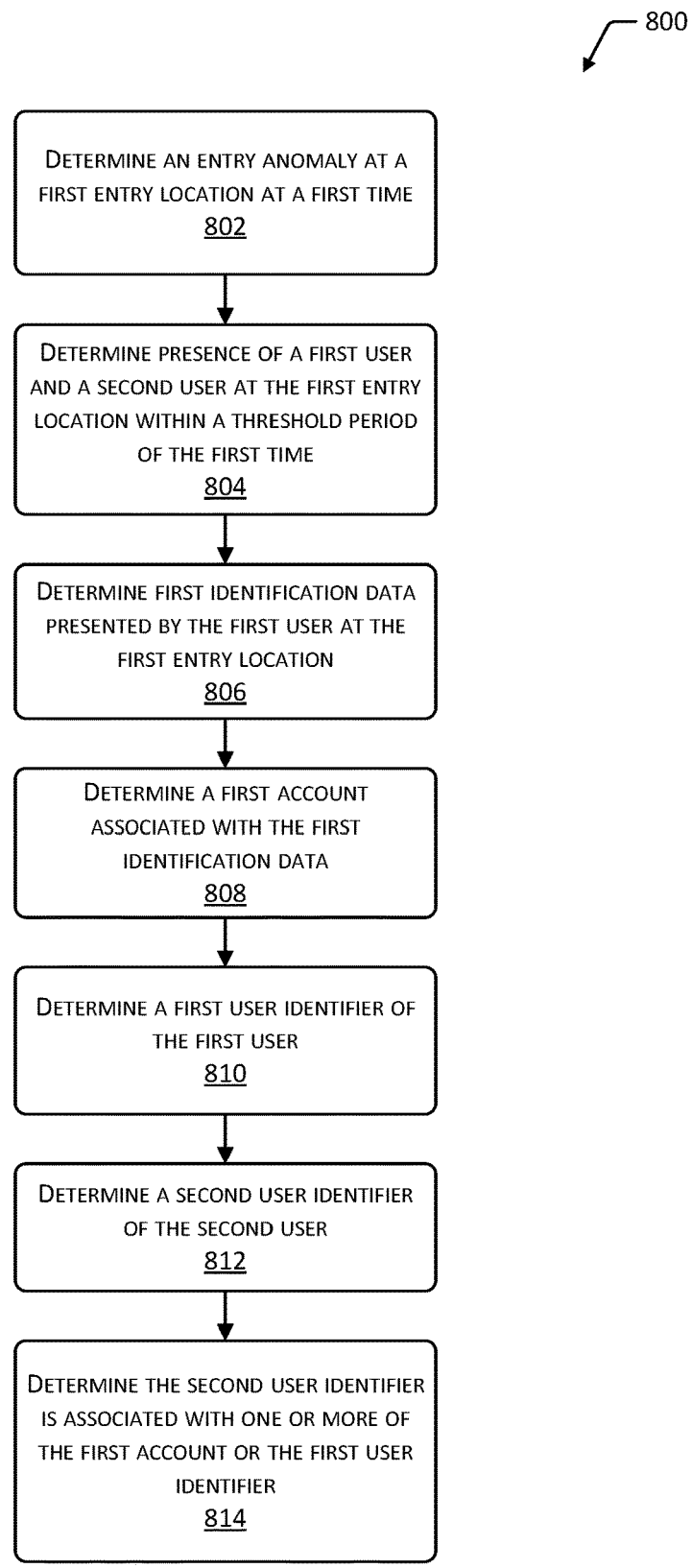
FIG. 8 illustrates a flow diagram of another process to determine a first user is associated with a second user, according to some implementations.

FIG. 8 illustrates a flow diagram 800 of another process to determine a first user is associated with a second user, according to some implementations. The process may be implemented at least in part by the system 100 described herein.

At 802 an entry anomaly to a facility 102 is determined at a first entry location 104 at a first time. For example, the entry anomaly module 150 may use one or more of the gate data 128, the scan gesture data 140, the user location data 146, the height data 148, and so forth to determine an entry anomaly. In one implementation, an entry anomaly may be determined when there is a discrepancy between the number of users entering the facility 102 and the identification data 134 obtained, or not, by the gate 108.

The entry anomaly may be determined based on one or more of the following. The scan gesture data 140 may indicate that the user 118 passing through the gate 108 did not perform a scan gesture. Two or more users 118 may pass through the first entry location 104 within a threshold time of one another. A count of identification data 134 presented at the first entry location 104 at the first time may differ from a count of a number of users detected at the first entry location 104. A user 118 may be determined inside the facility 102 without data indicative of that user 118 having passed through the entry location 104. A user 118 who entered the facility 102 while the gate 108 at the entry location 104 was closed may be determined. In other implementations, other anomalies may be determined.

At 804 presence of two or more users 118 at the first entry location 104 within a threshold time of the first time may be determined. For example, the first user 118 and the second user 118 may be determined at the first gate 108 within the entry threshold time 408.

At 806 first identification data 134 as presented by the first user 118 at the first entry location 104 is determined. The identification data 134 may be indicative of one or more of: a machine-readable code presented by an electronic device, data transmitted by the electronic device, one or more features of at least a portion of a hand 210 of the first user 118, and so forth. For example, the scanner 110 of the gate 108 may obtain image data 136 of at least a portion of the first user's hand 210 to use for biometric identification of the user 118. In some implementations verification or authentication of the identification data 134 may not be a prerequisite for entry 404 into the facility 102. For example, a user 118 may enter the facility 102 even if their account is no longer considered active. Continuing this example, a human operator may be dispatched to assist this unauthorized user 118.

At 808 a first account associated with the first identification data 134 is determined. For example, the first identification data 134 may be used to determine an affirmative identity of the first user 118, such as associated with a particular name or account number.

At 810 a first user identifier 144 is determined for the first user 118. For example, the first user identifier 144 may be assigned by the user location module 142. In another implementation, the first user identifier 144 may be based on, or associated with an identity or account associated with the identification data 134.

At 812 a second user identifier 144 is determined for the second user 118. Continuing the example, a second user identifier 144 may be assigned by the user location module 142 to the second user 118.

At 814 the second user identifier 144 is associated with one or more of the first account or the first user identifier 144. For example, based on one or more of the gate data 128, the scan gesture data 140, the user location data 146, the height data 148, the user behavior data 154, or the historical data 158, group data 160 may be generated that indicates the association between these users 118 or associates the second user or second user identifier 144 with the first account.

In one implementation, the association may be based at least in part on entry and exit times of users 118. A first entry time of the first user 118 to the facility 102 at the first entry location 104 may be determined. A second entry time of the second user 118 to the facility 102 at the first entry location 104 may be determined. A first difference between the first entry time and the second entry time may be determined to be less than a first threshold. A first exit time of the first user 118 from the facility 102 at a first exit location 106 is determined. A second exit time of the second user 118 from the facility 102 at the first exit location 106 is determined. A second difference between the first exit time and the second exit time is determined to be less than a second threshold.

The entry and exit times may be compared to a particular threshold. If two or more users 118 enter with some minimum spacing but less than a maximum amount of time, this may be indicative of association between them. A first entry time of the first user 118 to the facility 102 at the first entry location 104 may be determined. A second entry time of a second user 118 to the facility 102 at the first entry location 104 may be determined. A first difference between the first entry time and the second entry time is determined to be less than a first threshold. If that first difference is greater than a second threshold and less than a second threshold, the users 118 involved may be deemed to be associated. For example, the entry threshold time 408 may specify the first threshold as a maximum time, but there is some minimum time for users 118 to physically move through the gate 108. Multiple user entries that are less than this threshold minimum time may be deemed to be erroneous, and thus may be discarded from consideration.

In another implementation, the association may be based at least in part on the scan gesture data 140. For example, a first scan gesture by the first user 118 at the first entry location 104 may be determined. The first scan gesture is associated with presentation of the first identification data 134 by the first user 118. This attempt to present identification data 134 may be indicative of the user 118 entering the facility solo 306. Similarly, absence of the scan gesture by the second user 118 may be suggestive of group membership. Continuing the example, the second user 118 omitting the scan gesture during entry 404 may be indicative of the second user 118 entering the facility 102 with another user 118, as a member of a group 308.

In another implementation, the association may be based at least in part on the height data 148. For example, users 118 who are below the threshold height 304 may be determined to be members of a group 308. This assessment may be combined with others described herein. For example, a user 118 who is below the threshold height 304 and fails to provide identification data 134 may be deemed to be a member of a group 308 who is associated with some other user 118.

In another implementation, instead of or in addition to the use of the entry and exit times, interactions between users 118 that are expressed in the user behavior data 154 may be used to determine the association between the first user 118 and the second user 118. Based at least in part on this, the group data 160 may be generated that indicates that the two users 118 are associated.

These interactions may include one or more of the following. The first user 118 and the second user 118 may be determined to have been within a first threshold distance of one another within the facility 102 for at least a first duration of a session. A transfer of an object 506 between the first user 118 and the second user 118 may be observed during a session. The first user 118 and the second user 118 may be determined to be within a second threshold distance and also facing each other at least a threshold number of times during a session.

The determination of the association may also be based at least in part on the historical data 158. For example, the first user 118 may be affirmatively identified, such that they are associated with a particular user account. If that particular user account has a history of transactions that involve a guest to the facility 102, the confidence value that another user 118 in the facility 102 is their guest may be increased.

Users 118 of the facility 102 may be partitioned into either solo 306 individuals or possible groups 308. Returning to the example described above with regard to users 118(1)-(4), the user 118(1) entered before the second user 118(2) and presented first identification data 134. The second user 118(2) presented second identification data 134. Based on the difference in identification data 134, a sequence of users is partitioned, and the user 118(1) is not a candidate to be associated with the user 118(3). Other techniques described herein may be used to resolve the potential ambiguity as to whether user 118(3) is associated with user 118(2) or user 118(4). For example, one or more of the exit times of these users 118, user behavior data 154, and so forth may be used to disqualify the user 118(4) from being associated with user 118(3).

In some implementations the sequence and type of entries may be used to determine the group data 160. For example, in a "frontgating" situation the user 118(2) may allow the guest user 118(3) to precede them through the entry gate 108. The user 118(3) may enter without presenting identification data 134 or making a scan gesture, while the user 118(2) follows and provides the identification data 134 twice, once for self and once for guest. In this example, the group data 160 may be determined prior to exit 406 of these users 118 due to the count of the scan gesture matching the number of users who entered.

Figure 9:
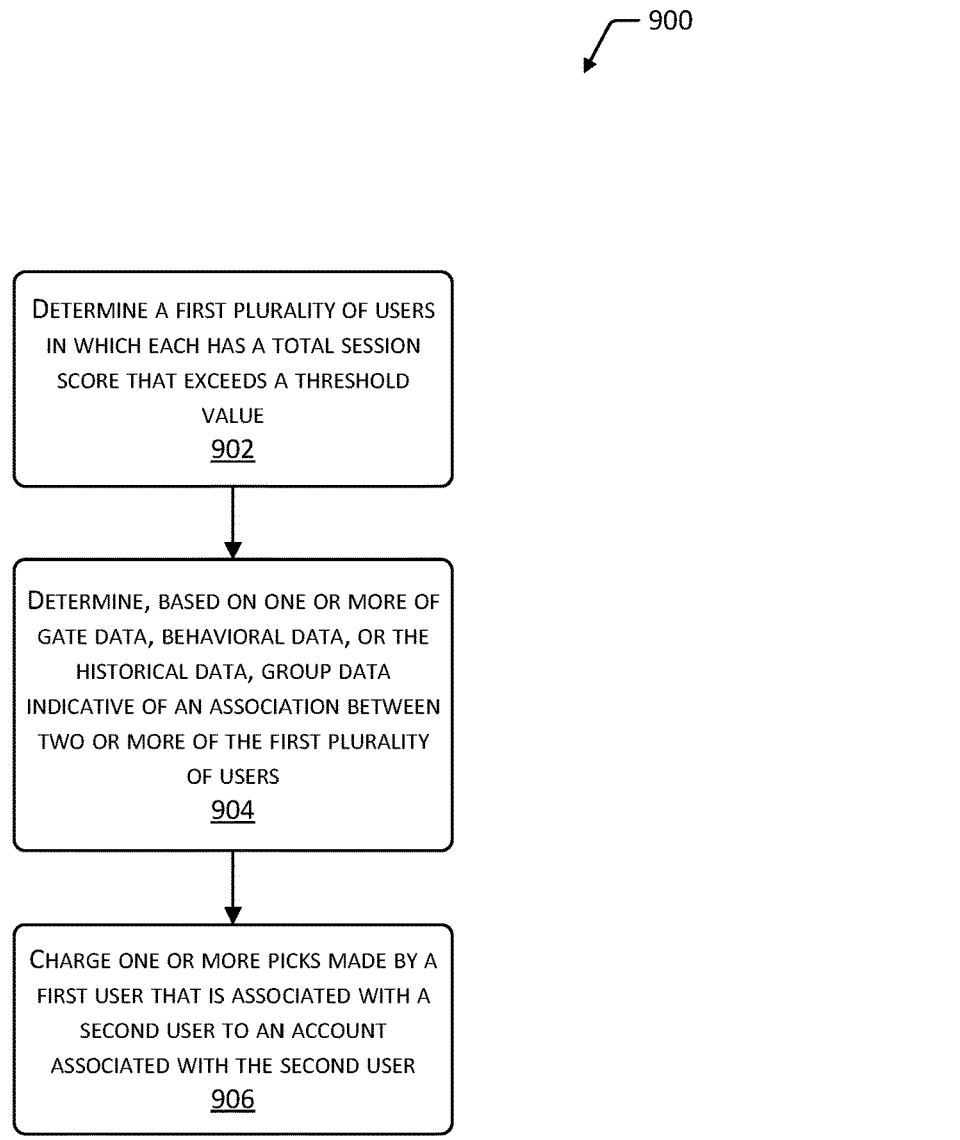
FIG. 9 illustrates a flow diagram of yet another process to determine a first user is associated with a second user, according to some implementations.

FIG. 9 illustrates a flow diagram 900 of yet another process to determine a first user is associated with a second user, according to some implementations. The process may be implemented at least in part by the system 100 described herein.

At 902 a first plurality of users 118 is determined in which each user 118 has a total session score 610 that exceeds a threshold value. For example, the total session score 610 may be calculated as described above with regard to FIG. 6.

At 904 group data 160 is determined based on one or more of the gate data 128, the scan gesture data 140, the height data 148, the user behavior data 154, or the historical data 158. The group data 160 associates two or more of the first plurality of users 118 with a common group 308. For example, based on the entry and exit times and the user 118(3) placing objects 506 into a single cart 120 associated with the user 118(2), the group data 160 is generated that indicates the third user 118(3) is associated with the second user 118(2).

At 906, one or more picks of items 116 that are made by one user 118 in the group 308 are charged to an account associated with another user 118 in the group 308. For example, a pick made by the third user 118(3) may be billed to an account associated with the second user 118(2). In other implementations, other charges or credits to an account may be determined based on the group data 160. For example, if the user 118(2) picks an item 116 from the inventory location 114 and passes the item 116 to the user 118(3) who then returns the item 116 to the inventory location 114, there would be no charge to the account associated with the user 118(2).

Figure 10:
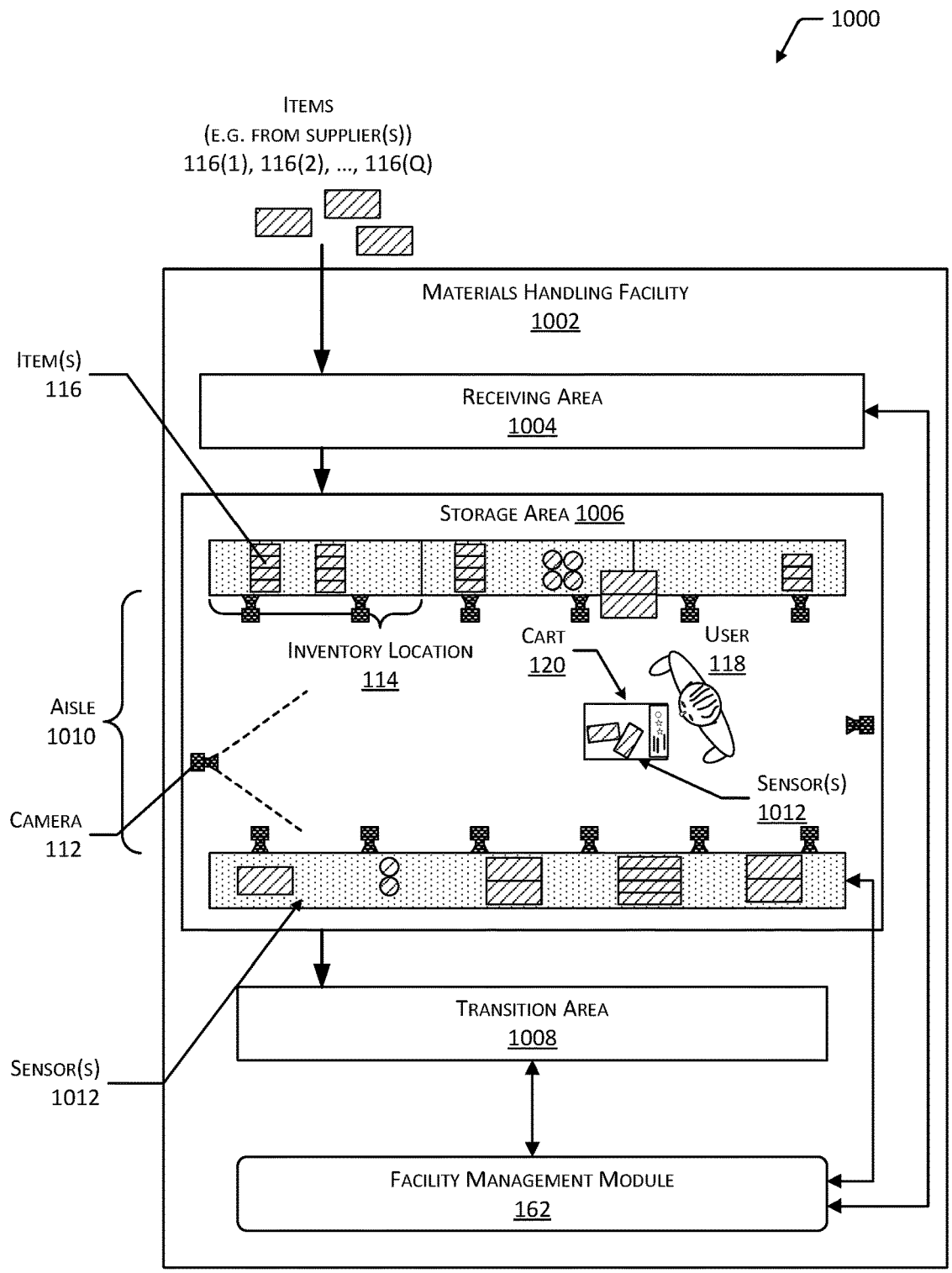
FIG. 10 is a block diagram illustrating a materials handling facility (facility) using the system, according to some implementations.

FIG. 10 is a block diagram 1000 illustrating a materials handling facility (facility) 1002 using the system 100, according to some implementations. A facility 1002 comprises one or more physical structures or areas within which one or more items 116(1), 116(2), . . . , 116(Q) may be held.

The items 116 may comprise physical goods, such as books, pharmaceuticals, repair parts, electronic gear, and so forth.

The facility 1002 may include one or more areas designated for different functions with regard to inventory handling. In this illustration, the facility 1002 includes a receiving area 1004, a storage area 1006, and a transition area 1008.

The receiving area 1004 may be configured to accept items 116, such as from suppliers, for intake into the facility 1002. For example, the receiving area 1004 may include a loading dock at which trucks or other freight conveyances unload the items 116. In some implementations, the items 116 may be processed, at the receiving area 1004, to generate at least a portion of the item data. For example, an item 116 may be weighed, imaged or otherwise scanned to develop reference images or representations of the item 116 at the receiving area 1004.

The storage area 1006 is configured to store the items 116. The storage area 1006 may be arranged in various physical configurations. In one implementation, the storage area 1006 may include one or more aisles 1010. The aisle 1010 may be configured with, or defined by, inventory locations 114 on one or both sides of the aisle 1010. The inventory locations 114 may include one or more of a platform, a rack, a case, a cabinet, a bin, a floor location, or other suitable storage mechanisms for holding, supporting, or storing the items 116. For example, the inventory locations 114 may comprise shelves with areas such as lanes designated therein. The inventory locations 114 may be affixed to the floor or another portion of the structure of the facility 1002. The inventory locations 114 may also be movable such that the arrangements of aisles 1010 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 1002 to another.

One or more users 118(1), 118(2), ..., 118(U) and carts 120(1), 120(2), ..., 120(T) or other material handling apparatus may move within the facility 1002. For example, the user 118 may move about within the facility 1002 to pick or place the items 116 in various inventory locations 114, placing them in the cart 120 for ease of transport. The cart 120 is configured to carry or otherwise transport one or more items 116. For example, the cart 120 may include a basket, bag, bin, and so forth. In other implementations, other material handling apparatuses such as robots, forklifts, cranes, aerial drones, and so forth, may move about the facility 1002 picking, placing, or otherwise moving the items 116. For example, a robot may pick an item 116 from a first inventory location 114(1) and move the item 116 to a second inventory location 114(2).

While the storage area 1006 is depicted as having one or more aisles 1010, inventory locations 114 storing the items 116, sensors 1012, and so forth, it is understood that the receiving area 1004, the transition area 1008, or other areas of the facility 1002 may be similarly equipped. Furthermore, the arrangement of the various areas within the facility 1002 is depicted functionally rather than schematically. For example, in some implementations, multiple different receiving areas 1004, storage areas 1006, and transition areas 1008 may be interspersed rather than segregated in the facility 1002.

The facility 1002 may include, or be coupled to, one or more servers 124 providing the facility management module 162 described above. The facility management module 162 is configured to interact with users 118 or devices such as sensors 1012, robots, material handling equipment, computing devices, and so forth, in one or more of the receiving area 1004, the storage area 1006, or the transition area 1008.

During operation of the facility 1002, the weight sensors 1012(1) and other sensors 1012 may be configured to provide sensor data, or information based on the sensor data, to the facility management module 162. In addition to data obtained from the weight sensors 1012(1), the sensor data may include image data 136, non-image data, and so forth. The sensors 1012 may include, but are not limited to, cameras 112, weight sensors 1012(1), and so forth. The sensors 1012 may be stationary or mobile, relative to the facility 1002. For example, the facility 1002 may include cameras 112 to obtain images of the user 118 or other objects 506 in the facility 1002. In another example, the inventory locations 114 may contain weight sensors 1012(1) to acquire weight sensor data of items 116 stowed therein, cameras 112 to acquire images of picking or placement of items 116 on shelves, and so forth. The sensors 1012 are described in more detail below with regard to FIG. 11.

The facility management module 162 or other systems may use the sensor data to track the location of objects 506 within the facility 1002, movement of the objects 506, or provide other functionality. Objects 506 may include, but are not limited to, items 116, users 118, carts 120, and so forth. For example, a series of images acquired by the cameras 112 may indicate removal by the user 118 of an item 116 from a particular location at the inventory location 114 and placement of the item 116 on or at least partially within the cart 120.

The facility 1002 may be configured to receive different kinds of items 116 from various suppliers and to store them until a customer orders or retrieves one or more of the items 116. A general flow of items 116 through the facility 1002 is indicated by the arrows of FIG. 10. Specifically, as illustrated in this example, items 116 may be received from one or more suppliers, such as manufacturers, distributors, wholesalers, and so forth, at the receiving area 1004. In various implementations, the items 116 may include merchandise, commodities, perishables, or any suitable type of item 116, depending on the nature of the enterprise that operates the facility 1002.

Upon being received from a supplier at the receiving area 1004, the items 116 may be prepared for storage in the storage area 1006. For example, in some implementations, items 116 may be unpacked or otherwise rearranged. The facility management module 162 may include one or more software applications executing on a computer system to provide inventory management functions. These inventory management functions may include maintaining information indicative of the type, quantity, condition, cost, location, weight, or any other suitable parameters with respect to the items 116. The items 116 may be stocked, managed, or dispensed in terms of countable units, individual units, or multiple units, such as packages, cartons, crates, pallets, or other suitable aggregations. Alternatively, some items 116, such as bulk products, commodities, and so forth, may be stored in continuous or arbitrarily divisible amounts that may not be inherently organized into countable units. Such items 116 may be managed in terms of a measurable quantity such as units of length, area, volume, weight, time, duration, or other dimensional properties characterized by units of measurement. Generally speaking, a quantity of an item 116 may refer to either a countable number of individual or aggregate units of an item 116 or a measurable amount of an item 116, as appropriate.

After arriving through the receiving area 1004, items 116 may be stored within the storage area 1006. In some implementations, like items 116 may be stored or displayed together in the inventory locations 114 such as in bins, on shelves, hanging from pegboards, and so forth. In this implementation, all items 116 of a given kind are stored in one inventory location 114. In other implementations, like items 116 may be stored in different inventory locations 114. For example, to optimize retrieval of certain items 116 having frequent turnover within a large physical facility 1002, those items 116 may be stored in several different inventory locations 114 to reduce congestion that might occur at a single inventory location 114.

When a customer order specifying one or more items 116 is received, or as a user 118 progresses through the facility 1002, the corresponding items 116 may be selected or "picked" from the inventory locations 114 containing those items 116. In various implementations, item picking may range from manual to completely automated picking. For example, in one implementation, a user 118 may have a list of items 116 they desire and may progress through the facility 1002 picking items 116 from inventory locations 114 within the storage area 1006 and placing those items 116 into a cart 120. In other implementations, employees of the facility 1002 may pick items 116 using written or electronic pick lists derived from customer orders. These picked items 116 may be placed into the cart 120 as the employee progresses through the facility 1002.

After items 116 have been picked, the items 116 may be processed at a transition area 1008. The transition area 1008 may be any designated area within the facility 1002 where items 116 are transitioned from one location to another or from one entity to another. For example, the transition area 1008 may be a packing station within the facility 1002. When the item 116 arrives at the transition area 1008, the items 116 may be transitioned from the storage area 1006 to the packing station. Information about the transition may be maintained by the facility management module 162.

In another example, if the items 116 are departing the facility 1002, a list of the items 116 may be obtained and used by the facility management module 162 to transition responsibility for, or custody of, the items 116 from the facility 1002 to another entity. For example, a carrier may accept the items 116 for transport with that carrier accepting responsibility for the items 116 indicated in the list. In another example, a user 118 may purchase or rent the items 116 and remove the items 116 from the facility 1002. During use of the facility 1002, the user 118 may move about the facility 1002 to perform various tasks, such as picking or placing the items 116 at the inventory locations 114.

To facilitate operation of the facility 1002, the facility management module 162 is configured to use the identification data 134, sensor data, and other information such as item data, physical layout data, and so forth, to generate interaction data.

The interaction data may provide information about an interaction, such as a pick of an item 116 from the inventory location 114, a place of an item 116 to the inventory location 114, a touch made to an item 116 at the inventory location 114, a gesture associated with an item 116 at the inventory location 114, and so forth. The interaction data may include one or more of the type of interaction, interaction location identifier indicative of where from the inventory location 114 the interaction took place, item identifier, quantity change to the item 116, user identifier 144, and so forth. The interaction data may then be used to further update the item data. For example, the quantity of items 116 on hand at a particular lane on the platform may be changed based on an interaction that picks or places one or more items 116.

As described above, the facility management module 162 may perform other operations, determining inventory to restock, determining user billing data, and so forth.

Figure 11:
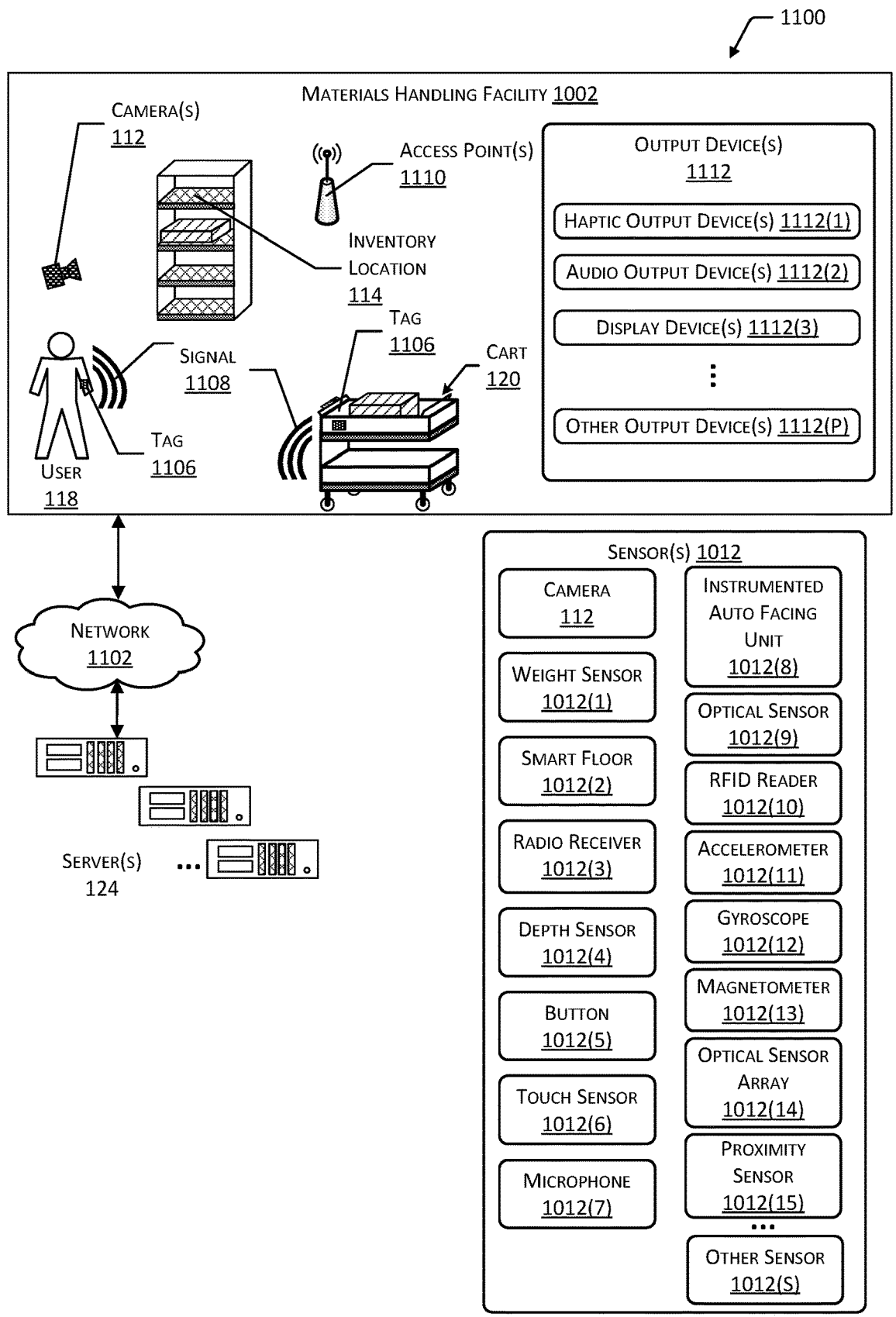
FIG. 11 is a block diagram illustrating additional details of the facility, according to some implementations.

FIG. 11 is a block diagram 1100 illustrating additional details of the facility 1002, according to some implementations. The facility 1002 may be connected to one or more networks 1102, which in turn connect to one or more computing devices, such as servers 124. The network 1102 may include private networks such as an institutional or personal intranet, public networks such as the Internet, or a combination thereof. The network 1102 may utilize wired technologies (e.g., wires, fiber optic cables, and so forth), wireless technologies (e.g., radio frequency, infrared, acoustic, optical, and so forth), or other connection technologies. The network 1102 is representative of any type of communication network, including one or more of data networks or voice networks. The network 1102 may be implemented using wired infrastructure (e.g., copper cable, fiber optic cable, and so forth), a wireless infrastructure (e.g., cellular, microwave, satellite, and so forth), or other connection technologies.

The servers 124 may be configured to execute one or more modules or software applications associated with the facility management module 162 or other systems. While the servers 124 are illustrated as being in a location outside of the facility 1002, in other implementations, at least a portion of the servers 124 may be located at the facility 1002. The servers 124 are discussed in more detail below with regard to FIG. 12.

The user 118, the carts 120, items 116, or other objects in the facility 1002 may be equipped with one or more tags 1106. The tags 1106 may be configured to emit a signal 1108. In one implementation, the tag 1106 may be a radio frequency identification (RFID) tag 1106 configured to emit an RF signal 1108 upon activation by an external signal. For example, the external signal may comprise a radio frequency signal or a magnetic field configured to energize or activate the RFID tag 1106. In another implementation, the tag 1106 may comprise a transmitter and a power source configured to power the transmitter. For example, the tag 1106 may comprise a Bluetooth Low Energy (BLE) transmitter and battery. In other implementations, the tag 1106 may use other techniques to indicate presence of the tag 1106. For example, an acoustic tag 1106 may be configured to generate an ultrasonic signal 1108, which is detected by corresponding acoustic receivers. In yet another implementation, the tag 1106 may be configured to emit an optical signal 1108.

The facility management module 162 may be configured to use the tags 1106 for one or more of identification of the object, determining a location of the object, and so forth. For example, the user 118 may wear tags 1106, the carts 120 may have tags 1106 affixed, items 116 may have tags 1106 affixed to their packaging, and so forth, which may be read and, based at least in part on signal strength, used to determine one or more of identity or location.

Generally, the facility management module 162 or other systems associated with the facility 1002 may include any number and combination of input components, output components, and servers 124.

The one or more sensors 1012 may be arranged at one or more locations within the facility 1002. For example, the sensors 1012 may be mounted on or within a floor, wall, at a ceiling, at an inventory location 114, on a cart 120, may be carried or worn by a user 118, and so forth.

The sensors 1012 may include one or more cameras 112 or other imaging sensors. The one or more cameras 112 may include imaging sensors configured to acquire images of a scene. The cameras 112 are configured to detect light in one or more wavelengths including, but not limited to, terahertz, infrared, visible, ultraviolet, and so forth. The cameras 112 may comprise charge coupled devices (CCD), complementary metal oxide semiconductor (CMOS) devices, microbolometers, and so forth. The facility management module 162 may use image data 136 acquired by the cameras 112 during operation of the facility 1002. For example, the facility management module 162 may identify items 116, users 118, carts 120, and so forth, based at least in part on their appearance within the image data 136 acquired by the cameras 112. The cameras 112 may be mounted in various locations within the facility 1002. For example, cameras 112 may be mounted overhead, on inventory locations 114, may be worn or carried by users 118, may be affixed to carts 120, and so forth.

The one or more weight sensors 1012(1) are configured to measure the weight of a load, such as the item 116, the cart 120, or other objects. The weight sensors 1012(1) may be configured to measure the weight of the load at one or more of the inventory locations 114, the cart 120, on the floor of the facility 1002, and so forth. For example, a platform of the inventory location 114 may include a plurality of weight sensors 1012(1). The weight sensors 1012(1) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 1012(1) may operate as transducers that generate one or more signals 1108 based on an applied force, such as that of the load due to gravity. For example, the weight sensor 1012(1) may comprise a load cell having a strain gauge and a structural member that deforms slightly when weight is applied. By measuring a change in the electrical characteristic of the strain gauge, such as capacitance or resistance, the weight may be determined. In another example, the weight sensor 1012(1) may comprise a force sensing resistor (FSR). The FSR may comprise a resilient material that changes one or more electrical characteristics when compressed. For example, the electrical resistance of a particular portion of the FSR may decrease as the particular portion is compressed. The facility management module 162 may use the data acquired by the weight sensors 1012(1) to identify an object 506, determine a change in the quantity of objects 506, determine a location of an object 506, maintain shipping records, and so forth.

The sensors 1012 may include a smart floor 1012(2). The smart floor 1012(2) is able to provide information about the location of objects, such as users 118, carts 120, and so forth. This information may include identifying the object, determining a location of the object, tracking the object, and so forth. The smart floor 1012(2) may utilize smart floor devices that comprise one or more of transmitters or receivers that radiate or receive electromagnetic signals 1108 from antennas located at or underneath the floor. Based on information about what antenna radiated a signal 1108 and what antenna acquired the signal 1108, information about an object 506 on or above the floor may be determined. For example, the smart floor 1012(2) may comprise sensing elements, or segments. Each segment may include an antenna that is coupled to one or more of a transmitter or a receiver. During operation, the segment may transmit an electromagnetic signal 1108 that is radiated by the antenna, receive an electromagnetic signal 1108 that is acquired by the antenna, or both. In some implementations the smart floor 1012(2) may operate as a physically large touch sensor that is deployed at floor level. The electromagnetic signals 1108 provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 1012(2) may be used to provide object representation movement data. For example, the output from the segments obtained during a particular window of time may be processed in a fashion similar to the image data 136.

One or more radio receivers 1012(3) may also be included as sensors 1012. In some implementations, the radio receivers 1012(3) may be part of transceiver assemblies. The radio receivers 1012(3) may be configured to acquire RF signals 1108 associated with RFID, Wi-Fi, Bluetooth, ZigBee, 2G, 3G, 4G, LTE, or other wireless data transmission technologies. The radio receivers 1012(3) may provide information associated with data transmitted via radio frequencies, signal strength of RF signals 1108, and so forth. For example, information from the radio receivers 1012(3) may be used by the facility management module 162 to determine a location of an RF source, such as a transmitter carried by the user 118, a transmitter on the cart 120, a tag 1106 on the item 116, and so forth.

One or more depth sensors 1012(4) may also be included in the sensors 1012. The depth sensors 1012(4) are configured to acquire spatial or three-dimensional (3D) data, such as depth information, about objects within a field-of-view (FOV). The depth sensors 1012(4) may include range cameras, lidar systems, sonar systems, radar systems, structured light systems, stereo vision systems, optical interferometry systems, and so forth. The facility management module 162 may use the 3D data acquired by the depth sensors 1012(4) to identify objects, determine a location of an object in 3D real space, identify users 118, and so forth.

One or more buttons 1012(5) may be configured to accept input from the user 118. The buttons 1012(5) may comprise mechanical, capacitive, optical, or other mechanisms. For example, the buttons 1012(5) may comprise mechanical switches configured to accept an applied force from a touch of the user 118 to generate an input signal. The facility management module 162 may use data from the buttons 1012(5) to receive information from the user 118. For example, the cart 120 may be configured with a button 1012(5) to accept input from the user 118 and send information indicative of the input to the facility management module 162.

The sensors 1012 may include one or more touch sensors 1012(6). The touch sensors 1012(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The facility management module 162 may use data from the touch sensors 1012(6) to receive information from the user 118. For example, the touch sensor 1012(6) may be integrated with the cart 120 to provide a touchscreen with which the user 118 may select from a menu one or more particular items 116 for picking, enter a manual count of items 116 at an inventory location 114, and so forth.

One or more microphones 1012(7) may be configured to acquire information indicative of sound present in the environment. In some implementations, arrays of microphones 1012(7) may be used. These arrays may implement beamforming techniques to provide for directionality of gain. The facility management module 162 may use the one or more microphones 1012(7) to acquire information from acoustic tags, accept voice input from the user 118, determine ambient noise level, and so forth.

The sensors 1012 may include instrumented auto facing units (IAFUs) 1012(8). The IAFU 1012(8) may comprise a position sensor configured to provide data indicative of displacement of a pusher. As an item 116 is removed from the IAFU 1012(8), the pusher moves, such as under the influence of a spring, and pushes the remaining items 116 in the IAFU 1012(8) to the front of the inventory location 114. By using data from the position sensor, and given item data such as a depth of an individual item 116, a count may be determined, based on a change in position data. For example, if each item 116 is 1 inch deep, and the position data indicates a change of 11 inches, the quantity held by the IAFU 1012(8) may have changed by 11 items 116. This count information may be used to confirm or provide a cross check for a count obtained by other means, such as analysis of the sensor data from the weight sensors 1012(1).

The sensors 1012 may include one or more optical sensors 1012(9). The optical sensors 1012(9) may be configured to provide data indicative of one or more of color or intensity of light impinging thereupon. For example, the optical sensor 1012(9) may comprise a photodiode and associated circuitry configured to generate a signal 1108 or data indicative of an incident flux of photons. As described below, the optical sensor array 1012(14) may comprise a plurality of the optical sensors 1012(9). The optical sensors 1012(9) may include photodiodes, photoresistors, photovoltaic cells, quantum dot photoconductors, bolometers, pyroelectric infrared detectors, and so forth. For example, the optical sensor 1012(9) may use germanium photodiodes to detect infrared light.

One or more radio frequency identification (RFID) readers 1012(10), near field communication (NFC) systems, and so forth, may be included as sensors 1012. For example, the RFID readers 1012(10) may be configured to read the RF tags 1106. Information acquired by the RFID reader 1012(10) may be used by the facility management module 162 to identify an object associated with the RF tag 1106 such as the item 116, the user 118, the cart 120, and so forth. For example, based on information from the RFID readers 1012(10) detecting the RF tag 1106 at a particular inventory location 114, an item 116 being placed or picked may be determined.

The sensors 1012 may include one or more accelerometers 1012(11), which may be worn or carried by the user 118, mounted to the cart 120, and so forth. The accelerometers 1012(11) may provide information such as the direction and magnitude of an imposed acceleration. Data such as rate of acceleration, determination of changes in direction, speed, and so forth, may be determined using the accelerometers 1012(11).

A gyroscope 1012(12) may provide information indicative of rotation of an object affixed thereto. For example, the cart 120 or other objects may be equipped with a gyroscope 1012(12) to provide data indicative of a change in orientation of the object.

A magnetometer 1012(13) may be used to determine an orientation by measuring ambient magnetic fields, such as the terrestrial magnetic field. The magnetometer 1012(13) may be worn or carried by the user 118, mounted to the cart 120, and so forth. For example, the magnetometer 1012(13) mounted to the cart 120 may act as a compass and provide information indicative of which direction the cart 120 is oriented.

An optical sensor array 1012(14) may comprise one or optical sensors 1012(9). The optical sensors 1012(9) may be arranged in a regular, repeating, or periodic two-dimensional arrangement such as a grid. The optical sensor array 1012(14) may generate image data 136. For example, the optical sensor array 1012(14) may be arranged within or below an inventory location 114 and obtain information about shadows of items 116, hand 210 of the user 118, and so forth.

The sensors 1012 may include proximity sensors 1012(15) used to determine presence of an object, such as the user 118, the cart 120, and so forth. The proximity sensors 1012(15) may use optical, electrical, ultrasonic, electromagnetic, or other techniques to determine a presence of an object. In some implementations, the proximity sensors 1012(15) may use an optical emitter and an optical detector to determine proximity. For example, an optical emitter may emit light, a portion of which may then be reflected by the object back to the optical detector to provide an indication that the object is proximate to the proximity sensor 1012(15). In other implementations, the proximity sensors 1012(15) may comprise a capacitive proximity sensor 1012(15) configured to provide an electrical field and determine a change in electrical capacitance due to presence or absence of an object within the electrical field.

The proximity sensors 1012(15) may be configured to provide sensor data indicative of one or more of a presence or absence of an object, a distance to the object, or characteristics of the object. An optical proximity sensor 1012(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 1012 such as a camera 112. Based on an apparent distance between the features of the structured light pattern, the distance to the object may be calculated. Other techniques may also be used to determine distance to the object. In another example, the color of the reflected light may be used to characterize the object, such as skin, clothing, cart 120, and so forth.

The sensors 1012 may include other sensors 1012(S) as well. For example, the other sensors 1012(S) may include light curtains, ultrasonic rangefinders, thermometers, barometric sensors, hygrometers, and so forth.

In some implementations, the sensors 1012 may include hardware processors, memory, and other elements configured to perform various functions. For example, the cameras 112 may be configured to generate image data 136, send the image data 136 to another device such as the server 124, and so forth.

The facility 1002 may include one or more access points 1110 configured to establish one or more wireless networks. The access points 1110 may use Wi-Fi, NFC, Bluetooth, or other technologies to establish wireless communications between a device and the network 1102. The wireless networks allow the devices to communicate with one or more of the sensors 1012, the facility management module 162, the tag 1106, a communication device of the cart 120, or other devices.

Output devices 1112 may also be provided in the facility 1002. The output devices 1112 are configured to generate signals 1108, which may be perceived by the user 118 or detected by the sensors 1012. In some implementations, the output devices 1112 may be used to provide illumination of the optical sensor array 1012(14).

Haptic output devices 1112(1) are configured to provide a signal 1108 that results in a tactile sensation to the user 118. The haptic output devices 1112(1) may use one or more mechanisms such as electrical stimulation or mechanical displacement to provide the signal 1108. For example, the haptic output devices 1112(1) may be configured to generate a modulated electrical signal 1108, which produces an apparent tactile sensation in one or more fingers of the user 118. In another example, the haptic output devices 1112(1) may comprise piezoelectric or rotary motor devices configured to provide a vibration, which may be felt by the user 118.

One or more audio output devices 1112(2) may be configured to provide acoustic output. The acoustic output includes one or more of infrasonic sound, audible sound, or ultrasonic sound. The audio output devices 1112(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 1112(3) may be configured to provide output, which may be seen by the user 118 or detected by a light-sensitive sensor 1012 such as a camera 112 or an optical sensor 1012(9). In some implementations, the display devices 1112(3) may be configured to produce output in one or more of infrared, visible, or ultraviolet light. The output may be monochrome or in color. The display devices 1112(3) may be one or more of emissive, reflective, microelectromechanical, and so forth. An emissive display device 1112(3), such as using LEDs, is configured to emit light during operation. In comparison, a reflective display device 1112(3), such as using an electrophoretic element, relies on ambient light to present an image. Backlights or front lights may be used to illuminate non-emissive display devices 1112(3) to provide visibility of the output in conditions where the ambient light levels are low.

The display devices 1112(3) may be located at various points within the facility 1002. For example, addressable displays may be located on inventory locations 114, carts 120, on the floor of the facility 1002, and so forth.

Other output devices 1112(P) may also be present. For example, the other output devices 1112(P) may include scent/odor dispensers, document printers, 3D printers or fabrication equipment, and so forth.

Figure 12:
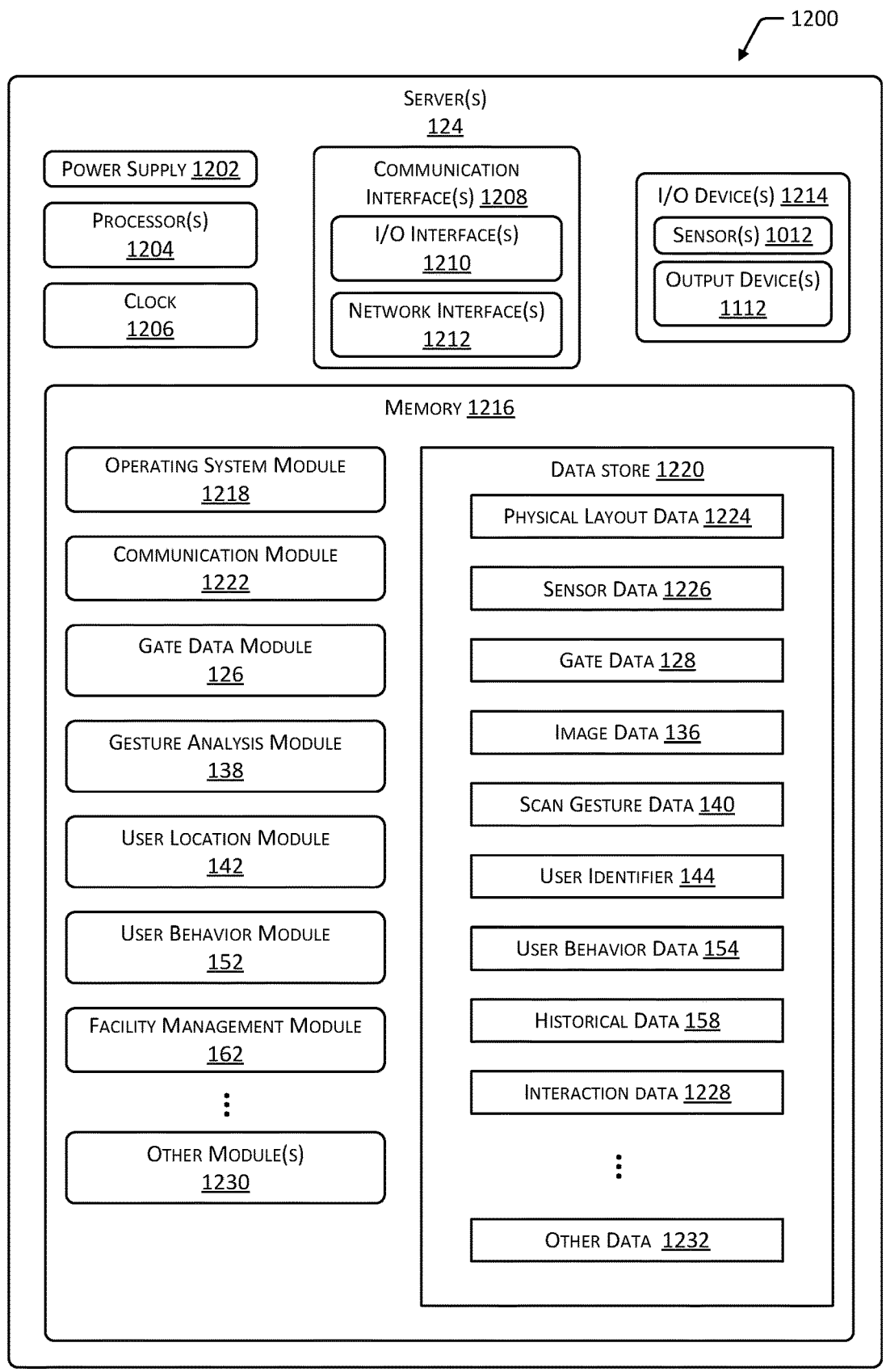
FIG. 12 is a block diagram of a server to support operation of the facility, according to some implementations.

FIG. 12 illustrates a block diagram 1200 of a server 124 configured to support operation of the facility 1002, according to some implementations. The server 124 may be physically present at the facility 1002, may be accessible by the network 1102, or a combination of both. The server 124 does not require end-user knowledge of the physical location and configuration of the system that delivers the services. Common expressions associated with the server 124 may include "on-demand computing", "software as a service (SaaS)", "platform computing", "network-accessible platform", "cloud services", "data centers", and so forth. Services provided by the server 124 may be distributed across one or more physical or virtual devices.

One or more power supplies 1202 may be configured to provide electrical power suitable for operating the components in the server 124. The one or more power supplies 1202 may comprise batteries, capacitors, fuel cells, photovoltaic cells, wireless power receivers, conductive couplings suitable for attachment to an external power source such as provided by an electric utility, and so forth. The server 124 may include one or more hardware processors 1204 (processors) configured to execute one or more stored instructions. The processors 1204 may comprise one or more cores. One or more clocks 1206 may provide information indicative of date, time, ticks, and so forth. For example, the processor 1204 may use data from the clock 1206 to associate a particular interaction with a particular point in time.

The server 124 may include one or more communication interfaces 1208 such as input/output (I/O) interfaces 1210, network interfaces 1212, and so forth. The communication interfaces 1208 enable the server 124, or components thereof, to communicate with other devices or components. The communication interfaces 1208 may include one or more I/O interfaces 1210. The I/O interfaces 1210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1210 may couple to one or more I/O devices 1214. The I/O devices 1214 may include input devices such as one or more of a sensor 1012, keyboard, mouse, scanner, and so forth. The I/O devices 1214 may also include output devices 1112 such as one or more of a display device 1112(3), printer, audio speakers, and so forth. In some embodiments, the I/O devices 1214 may be physically incorporated with the server 124 or may be externally placed.

The network interfaces 1212 may be configured to provide communications between the server 124 and other devices, such as the carts 120, routers, access points 1110, and so forth. The network interfaces 1212 may include devices configured to couple to personal area networks (PANS), local area networks (LANs), wireless local area networks (WLANS), wide area networks (WANs), and so forth. For example, the network interfaces 1212 may include devices compatible with Ethernet, Wi-Fi, Bluetooth, and so forth.

The server 124 may also include one or more busses or other internal communications hardware or software that allow for the transfer of data between the various modules and components of the server 124.

As shown in FIG. 12, the server 124 includes one or more memories 1216. The memory 1216 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1216 provides storage of computer-readable instructions, data structures, program modules, and other data for the operation of the server 124. A few example functional modules are shown stored in the memory 1216, although the same functionality may alternatively be implemented in hardware, firmware, or as a system on a chip (SoC).

The memory 1216 may include at least one operating system (OS) module 1218. The OS module 1218 is configured to manage hardware resource devices such as the I/O interfaces 1210, the I/O devices 1214, the communication interfaces 1208, and provide various services to applications or modules executing on the processors 1204. The OS module 1218 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1216 may be a data store 1220 and one or more of the following modules. These modules may be executed as foreground applications, background tasks, daemons, and so forth. The data store 1220 may use a flat file, database, linked list, tree, executable code, script, or other data structure to store information. In some implementations, the data store 1220 or a portion of the data store 1220 may be distributed across one or more other devices including the servers 124, network attached storage devices, and so forth.

A communication module 1222 may be configured to establish communications with one or more of the carts 120, sensors 1012, display devices 1112(3), other servers 124, or other devices. The communications may be authenticated, encrypted, and so forth.

The memory 1216 may store the facility management module 162. The facility management module 162 is configured to provide the functions as described herein. For example, the facility management module 162 may track items 116 between different inventory locations 114, to and from the carts 120, generate restocking orders, direct operation of robots within the facility, use the identification data 134 to associate a particular user identity with a user 118 in the facility 1002, and so forth. During operation, the facility management module 162 may access sensor data such as one or more of image data from the cameras 112, weight data from the weight sensors 1012(1), and so forth.

Information used by the facility management module 162 may be stored in the data store 1220. For example, the data store 1220 may be used to store physical layout data 1224, sensor data 1226, identification data 134, user location data 146, interaction data 1228, and so forth. The sensor data 1226 may comprise information obtained from one or more of the sensors 1012 in or associated with the facility 1002.

The physical layout data 1224 may provide information indicative of where scanners 110, cameras 112, weight sensors 1012(1), antennas for the radio receivers 1012(3), inventory locations 114, and so forth are in the facility 1002 with respect to one another. For example, the physical layout data 1224 may comprise information representative of a map or floor plan of the facility 1002 with relative positions of gates 108 with scanners 110 and inventory locations 114.

The facility management module 162 may generate interaction data 1228 that is indicative of an interaction, such as a pick of an item 116 from the inventory location 114, a place of an item 116 to the inventory location 114, a touch made to an item 116 at the inventory location 114, a gesture associated with an item 116 at the inventory location 114, and so forth. The interaction data 1228 may include one or more of the type of interaction, interaction location identifier indicative of where from the inventory location 114 the interaction took place, item identifier, quantity change to the item 116, user identifier 144, and so forth. The interaction data 1228 may then be used to update item data, associate a charge with a particular account, and so forth. For example, if the user 118 picks an item 116 and removes it from the facility 102, a payment account associated with that user 118 may be charged. The group data 160 may be used to associate interaction data 1228 of one user 118 with an another. For example, if the users 118(2) and 118(3) are grouped together, an interaction such as a pick of the item 116 by the user 118(3) may be charged to the payment account associated with the user 118(2).

The facility management module 162 may use the sensor data 1226 to generate the interaction data 1228. The interaction data 1228 may include information about the type of item 116 involved, quantity involved, whether the interaction was a pick or place, and so forth. Interactions may include the user 118 picking an item 116 from an inventory location 114, placing an item 116 at the inventory location 114, touching an item 116 at the inventory location 114, rummaging through items 116 at the inventory location 114, and so forth. For example, the facility management module 162 may generate interaction data 1228 that indicates what item 116 the user 118 picked from a particular lane on a shelf, and then use this interaction data 1228 to adjust the count of inventory stowed at that lane. The interaction data 1228 may then be used to bill an account associated with the user identifier 144 that is associated with the user 118 who picked the item 116.

The facility management module 162 may process the sensor data 1226 and generate output data. For example, based on the interaction data 1228, a quantity of a type of item 116 at a particular inventory location 114 may drop below a threshold restocking level. The system may generate output data comprising a restocking order indicative of the inventory location 114, the area, and a quantity needed to replenish stock to a predetermined level. The restocking order may then be used to direct a robot to restock that inventory location 114.

Other modules 1230 may also be present in the memory 1216 as well as other data 1232 in the data store 1220. For example, a billing module may use the interaction data 1228 and the identification data 134 to bill an account associated with a particular user 118, or a user 118 in the same group 308 as indicated by the group data 160.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a gate at a facility comprising:
        a first pedestal on a first side and a second pedestal on a second side that form a passage in between;
        a first camera at the second pedestal, wherein the first camera has a first field of view directed upward; and
        a second camera having a second field of view that includes at least a portion of the gate and the passage; and
    a first computing device to:
        access gate data associated with the gate;
        access first image data acquired by the first camera;
        determine, based on the first image data from the first camera, that a first user at the gate is associated with a first account;
        determine, based on a comparison of the gate data and the first image data, that a second user at the gate is not associated with an account;
        access second image data acquired by the second camera;
        determine, based on the second image data from the second camera, a first entry time of the first user to the facility and a second entry time of the second user to the facility;
        determine a first difference between the first entry time and the second entry time is less than a first threshold;
        determine, based on the second image data from the second camera, a first exit time of the first user from the facility and a second exit time of the second user from the facility;
        determine a second difference between the first exit time and the second exit time is less than a second threshold;
        determine group data indicative of the first user being associated with the second user;
        associate the second user with the first account, based on the group data;
        receive data that indicates the second user took an item from the facility; and
        determine a charge for the item to the first account.

2. The system of claim 1, further comprising a third camera having a third field of view in the facility; and
    the first computing device further to:
        determine, based on third image data from the third camera, that the first user and the second user are within a threshold distance of one another for at least a first duration; and
        wherein the group data is based at least in part on the first user and the second user being within the threshold distance of one another for the at least the first duration.

3. A computer-implemented method comprising:
    accessing gate data from a first image sensor at a gate located at a first entry location to a facility;
    accessing image data from one or more second image sensors associated with the first entry location;
    determining, based on a comparison of the gate data and the image data, that a first user at the first entry location to the facility is associated with an account at a first time and a second user at the first entry location to the facility is not associated with an account at the first time;
    determining, within a first threshold time of the first time, presence of the first user at the first entry location;
    determining, within a second threshold time of the first time, presence of the second user at the first entry location;
    determining first data presented by the first user at the gate at the first entry location at the first time;
    determining a first account associated with the first data, wherein the first account is associated with the first user;
    determining group data indicative of the first user being associated with the second user;
    based on the group data, associating the second user with the first account;
    receiving data that indicates the second user took an item from the facility; and
    determining a charge for the item to the first account.

4. The computer-implemented method of claim 3, further comprising one or more of:
    determining the second user did not perform a scan gesture at the gate,
    determining the second user passed through the gate at the first entry location within a third threshold time of the first user, or
    determining a count of data presented at the gate at the first entry location within a fourth threshold time of the first time differs from a count of a number of people detected at the first entry location.

5. The computer-implemented method of claim 3, further comprising:
    acquiring a plurality of images of the first entry location; and
    determining, based on the plurality of images, that a hand of the second user was not within a specified region that is proximate to a scanner at the gate at the first entry location while the second user was at the first entry location.

6. The computer-implemented method of claim 3, the determining the group data comprising:
   determining a first exit time of the first user from the facility at a first exit;
   determining a second exit time of the second user from the facility at the first exit; and
   determining a difference between the first exit time and the second exit time is less than a third threshold time.

7. The computer-implemented method of claim 3, the determining the group data comprising determining that the first user interacted with the second user within the facility.

8. The computer-implemented method of claim 7, the determining that the first user interacted with the second user further comprising one or more of:
   determining the first user and the second user are within a first threshold distance of one another within the facility for at least a first duration,
   determining a transfer of an object between the first user and the second user, or
   determining the first user and the second user are within a second threshold distance and face each other a threshold number of times.

9. The computer-implemented method of claim 3, the determining the group data comprising:
   determining a first gesture by the first user at the gate at the first entry location, wherein the first gesture is associated with the presentation of the first data by the first user; and
   determining an absence of a second gesture by the second user to present second data at the gate at the first entry location.

10. The computer-implemented method of claim 3, the determining the group data comprising:
    determining a height of the second user; and
    determining the height is less than a threshold height.

11. The computer-implemented method of claim 3, the determining the first account group data comprising:
    determining that historical data indicates the first account has previously been associated with another user at the facility.

12. The computer-implemented method of claim 3, the determining the first account group data comprising:
    determining a first entry time of the first user to the facility at the first entry location;
    determining a second entry time of the second user to the facility at the first entry location;
    determining a third entry time of a third user to the facility at the first entry location, wherein the third entry time is before the first entry time or after the second entry time;
    determining second data presented by the third user at the first entry location; and
    disqualifying the third user from being associated with the first account.

13. The computer-implemented method of claim 3, the determining the first account group data comprising:
    determining a first entry time of the first user to the facility at the first entry location;
    determining a second entry time of the second user to the facility at the first entry location; and
    determining a first difference between the first entry time and the second entry time is less than a first threshold and greater than a second threshold.

14. A computer-implemented method comprising:
    obtaining entry data from one or more first sensors at an entry location of a facility;
    obtaining image data from one or more image sensors at the facility;
    determining, based at least in part on a comparison of the entry data and the image data, that a first user at the entry location in the facility is associated with a first account at a first time and a second user at the entry location in the facility is not associated with an account at the first time;
    determining, based at least in part on the entry data and the image data, that the first user and the second user are associated with the first time;
    determining group data indicative of the first user being associated with the second user;
    based on the group data, associating the second user with the first account;
    receiving data that indicates the second user took an item from the facility; and
    determining a charge for the item to the first account.

15. The computer-implemented method of claim 14, further comprising one or more of:
    determining the second user did not perform a scan gesture at the entry location,
    determining the second user passed through the entry location within a threshold time of the first user,
    determining the second user entered the facility while a gate at the entry location was closed,
    determining a count of data presented at the entry location at the first time differs from a count of a number of people detected at the entry location, or
    determining presence of the second user inside the facility without data indicative of the second user passing through the entry location.

16. The computer-implemented method of claim 14, the determining the group data comprising:
    determining a first entry time of the first user to the facility at the entry location;
    determining a second entry time of the second user to the facility at the entry location;
    determining a first difference between the first entry time and the second entry time is less than a first threshold;
    determining a first exit time of the first user from the facility at a first exit;
    determining a second exit time of the second user from the facility at the first exit; and
    determining a second difference between the first exit time and the second exit time is less than a second threshold.

17. The computer-implemented method of claim 14, the determining the group data comprising one or more of:
    determining the first user and the second user are within a first threshold distance of one another within the facility for at least a first duration,
    determining a transfer of an object between the first user and the second user, or
    determining the first user and the second user are within a second threshold distance and face each other a threshold number of times.

18. The computer-implemented method of claim 14, the determining the group data comprising:
    determining a first gesture by the first user at the entry location, wherein the first gesture is associated with presentation of first data by the first user; and
    determining an absence of the first gesture by the second user at the entry location.

19. The computer-implemented method of claim 14, the determining the group data comprising:
- determining a height of the second user; and
- determining the height is less than a threshold height.

20. The computer-implemented method of claim 14, the determining the group data comprising:
- determining a first entry time of the first user to the facility at the entry location;
- determining first data presented by the first user at the entry location;
- determining a second entry time of the second user to the facility at the entry location;
- determining that the second user did not present identification data at the entry location;
- determining a third entry time of a third user to the facility at the entry location, wherein the third entry time is before the first entry time or after the second entry time;
- determining second data presented by the third user at the entry location; and
- disqualifying the third user from being associated with the first account.

21. The computer-implemented method of claim 14, further comprising:
- acquiring a plurality of images of the entry location; and
- determining, based on the plurality of images, that a hand of the second user was not within a specified region that is proximate to a scanner at a gate at the entry location while the second user was at the entry location.

\* \* \* \* \*

UNITED STATES PATENT AND TRADEMARK OFFICE
CERTIFICATE OF CORRECTION

PATENT NO.         : 11,734,688 B2
APPLICATION NO.    : 16/023748
DATED              : August 22, 2023
INVENTOR(S)        : Benjamin Charles Scarborough et al.

Page 1 of 1

It is certified that error appears in the above-identified patent and that said Letters Patent is hereby corrected as shown below:

In the Claims

Column 33, Claim 11, Line 41:
Currently reads: "determining the first account group data comprising:"
Where it should read: --determining the group data comprising:--.

Column 33, Claim 12, Line 46:
Currently reads: "determining the first account group data comprising:"
Where it should read: --determining the group data comprising:--.

Column 33, Claim 13, Line 60:
Currently reads: "determining the first account group data comprising:"
Where it should read: --determining the group data comprising:--.

Signed and Sealed this
Third Day of October, 2023

Katherine Kelly Vidal
*Director of the United States Patent and Trademark Office*